US008571501B2

(12) United States Patent
Miller et al.

(10) Patent No.: US 8,571,501 B2
(45) Date of Patent: Oct. 29, 2013

(54) CELLULAR HANDHELD DEVICE WITH FM RADIO DATA SYSTEM RECEIVER

(75) Inventors: Jason Miller, San Diego, CA (US); Mark D. Jerger, San Diego, CA (US); Stephen A. Sprigg, Poway, CA (US); Parag Palsapure, Navi Mumbai (IN)

(73) Assignee: QUALCOMM Incorporated, San Diego, CA (US)

( * ) Notice: Subject to any disclaimer, the term of this patent is extended or adjusted under 35 U.S.C. 154(b) by 1189 days.

(21) Appl. No.: 12/140,078

(22) Filed: Jun. 16, 2008

(65) Prior Publication Data

US 2009/0264149 A1 Oct. 22, 2009

Related U.S. Application Data

(60) Provisional application No. 61/046,476, filed on Apr. 21, 2008.

(51) Int. Cl.
*H04B 1/18* (2006.01)
*H04B 1/16* (2006.01)
*H04M 1/00* (2006.01)

(52) U.S. Cl.
USPC ...................... 455/179.1; 455/205; 455/552.1

(58) Field of Classification Search
USPC .................................... 455/552.1, 205, 179.1
See application file for complete search history.

(56) References Cited

U.S. PATENT DOCUMENTS 5,548,828 A * 8/1996 Kozaki et al. .............. 455/161.2
6,421,353 B1 * 7/2002 Kim .............................. 370/465
6,711,390 B1 * 3/2004 Moers ........................ 455/186.1
2002/0196748 A1 * 12/2002 De Mier ........................ 370/310
2003/0054804 A1 3/2003 Brandes et al.
2004/0198279 A1 10/2004 Anttila et al.
2005/0100116 A1 * 5/2005 Mason .......................... 375/316
2006/0141962 A1 6/2006 Forbes et al.
2006/0166617 A1 * 7/2006 Passmore ..................... 455/3.06
2007/0015480 A1 * 1/2007 Mason ....................... 455/186.1

(Continued)

FOREIGN PATENT DOCUMENTS

CN 1717873 A 1/2006
JP 2002538651 A 11/2002

(Continued)

OTHER PUBLICATIONS

International Search Report and Written Opinion—PCT/US2009/038334, International Search Authority—European Patent Office—Oct. 20, 2009.

(Continued)

*Primary Examiner* — John Blanton
(74) *Attorney, Agent, or Firm* — James T. Hagler

(57) ABSTRACT

A handheld device includes an FM receiver to receive FM radio signals and a processor that is configured to monitor Radio Data System (RDS) data within FM radio broadcasts and to activate an application when a particular RDS data pattern is received. Methods for recognizing and using the RDS data to activate or initiate applications on the handheld device enable a wide range of uses and new services. A server may provide data to the handheld device in response to queries which are based on or include part of the RDS data. Operating in conjunction with FM radio broadcasters, the handheld device and the server provide a data communication system that can deliver useful services and additional entertainment options for users.

54 Claims, 14 Drawing Sheets

(56) References Cited

U.S. PATENT DOCUMENTS

| | | | | |
|---|---|---|---|---|
| 2007/0093277 | A1 | 4/2007 | Cavacuiti et al. | |
| 2007/0143816 | A1* | 6/2007 | Gupta et al. | 725/135 |
| 2007/0167147 | A1* | 7/2007 | Krasner et al. | 455/404.2 |
| 2007/0248055 | A1* | 10/2007 | Jain et al. | 370/331 |
| 2007/0259649 | A1* | 11/2007 | Felder | 455/412.1 |
| 2007/0259650 | A1* | 11/2007 | Felder | 455/412.1 |
| 2007/0281644 | A1* | 12/2007 | Olgen | 455/186.1 |
| 2007/0291678 | A1* | 12/2007 | Chowdhury et al. | 370/328 |
| 2008/0144820 | A1* | 6/2008 | Hong | 380/212 |
| 2008/0166963 | A1* | 7/2008 | Nord | 455/3.05 |
| 2008/0299925 | A1* | 12/2008 | Walley et al. | 455/161.1 |
| 2009/0129361 | A1* | 5/2009 | Masamoto | 370/343 |
| 2009/0131002 | A1* | 5/2009 | Masamoto | 455/186.1 |
| 2009/0131003 | A1* | 5/2009 | Masamoto et al. | 455/186.1 |
| 2009/0131122 | A1* | 5/2009 | Masamoto | 455/574 |
| 2010/0291911 | A1* | 11/2010 | Kraft et al. | 455/418 |

FOREIGN PATENT DOCUMENTS

| | | | |
|---|---|---|---|
| KR | 20040104582 | | 12/2004 |
| KR | 100740191 | B1 | 7/2007 |
| KR | 20070076015 | A | 7/2007 |
| WO | WO0051235 | A1 | 8/2000 |
| WO | WO03090481 | A1 | 10/2003 |
| WO | WO2005013521 | A1 | 2/2005 |
| WO | WO2005039079 | A1 | 4/2005 |
| WO | WO2007138375 | | 12/2007 |

OTHER PUBLICATIONS

Kusche T, et al., "RadioText Plus—a new enhancement to the RDS RadioText service," EBU Technical Review, Jul. 2006.

* cited by examiner

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| G | G | G | G | A<br>B | TP | PTY | PTY | PTY | PTY | PTY | V<br>TA | V | V | V | V |

Prior Art
Fig. 1

| **TP (bit 10)** | **TA (bit 4)** | **Applications (in groups 0A, 0B, 15B)** |
|---|---|---|
| 0 | 0 | No traffic announcement on this station or on a network affiliate station |
| 0 | 1 | This station carries information about a network affiliate station that may broadcast traffic announcements |
| 1 | 0 | This station carries traffic announcements, and may carry information about a network affiliate that may carry traffic announcements, but no announcements are currently being broadcast |
| 1 | 1 | A traffic announcement is currently being broadcast on this station |

Prior Art
Fig. 2

| No. | Binary Value | 8-char Display | Meaning |
|---|---|---|---|
| 0 | 00000 | * * * * | No Program Type |
| 1 | 00001 | NEWS | News |
| 2 | 00010 | INFORM | Information |
| 3 | 00011 | SPORTS | Sports |
| 4 | 00100 | TALK | Talk |
| 5 | 00101 | ROCK | Rock |
| 6 | 00110 | CLS ROCK | Classic Rock |
| 7 | 00111 | ADLT HIT | Adult Hits |
| 8 | 01000 | SOFT ROCK | Soft Rock |
| 9 | 01001 | TOP 40 | Top 40 |
| 10 | 01010 | COUNTRY | Country |
| 11 | 01011 | OLDIES | Oldies |
| 12 | 01100 | SOFT | Soft |
| 13 | 01101 | NOSTALGA | Nostalgia |
| 14 | 01110 | JAZZ | Jazz |
| 15 | 01111 | CLASSICL | Classical |
| 16 | 10000 | R & B | Rhythm & Blues |
| 17 | 10001 | SOFT R&B | Soft Rhythm & Blues |
| 18 | 10010 | LANGUAGE | Language |
| 19 | 10011 | REL MUS | Religious Music |
| 20 | 10100 | REL TALK | Religious Talk |
| 21 | 10101 | PERSNLTY | Personality |
| 22 | 10110 | PUBLIC | Public |
| 23 | 10111 | | Unused |
| 24 | 11000 | | Unused |
| 25 | 11001 | | Unused |
| 26 | 11010 | | Unused |
| 27 | 11011 | | Unused |
| 28 | 11100 | | Unused |
| 29 | 11101 | | Unused |
| 30 | 11110 | TEST | Emergency Test |
| 31 | 11111 | ALERT! | Emergency |

Prior Art
Fig. 3

CELLULAR HANDHELD DEVICE WITH FM RADIO DATA SYSTEM RECEIVER

RELATED APPLICATIONS

The present application claims the benefit of priority to U.S. Provisional Patent Application No. 61/046,476 filed Apr. 21, 2008 entitled "Cellular Handheld Device with FM Radio Data System Receiver," the entire contents of which are hereby incorporated by reference.

FIELD OF THE INVENTION

The present invention relates to cellular handset devices, and more particularly to a mobile handset device configured to receive Radio Data System data.

BACKGROUND

The capabilities of cellular handheld devices increase every day as advances in microchip technology and able more circuits and functionality to be built into the devices. Consequently, cellular handheld devices have quickly evolved beyond simple communication devices to becoming personal communication/entertainment/information resources.

One source of information that has not been incorporated into cellular handheld devices is the Radio Data Systems (RDS) which communicates data to properly equipped FM radios as part of a normal FM radio broadcast. While some cellular devices have incorporated an FM receiver to enable users to listen to radio, none have made use of the RDS signals to provide interactive services. RDS is a technology that has been deployed in several countries around the world. Within the United States, the equivalent system is known as the radio broadcast data system (RBDS). For simplicity, references to RDS herein are intended to encompass RBDS, and the description of RDS technology is based on the U.S. RBDS implementation.

The RDS system makes use of a 57 kilohertz wide sub carrier within an FM frequency band to transmit a low data rate signal. The RDS data stream is produced by the FM broadcaster, and so is unique to the broadcasting station. Not all FM broadcasts include RDS data, as it is an option available to broadcasters, but not a requirement. Data is transmitted at a rate of 1187.5 bits per second, but with error encoding and other overhead communication, the system transmits about 300 bits per second of usable data. This data may be obtained by any FM radio including the necessary circuitry in functionality to receive and code the RDS Signal.

RDS data is transmitted into continuous stream of 16-bit packets illustrated in FIG. 1 which are transmitted in an endless repetition. The 16-bit packets are also referred to as data blocks. These packets come in four varieties based upon the pattern of bits in packet, referred to as types A, B, C, and D, each of which carries a different type of data as defined in the RDS standards. For example, the type A blocks contain the radio station call sign, type B blocks contain control information, type C blocks contain either the station call sign or data, and type D blocks contain data. The four types of blocks can be arranged into specific arrangements called groups of which there are 32 types, 16 type A groups and 16 type B groups. RDS standards define the content for each of these blocks and groups or types of data packets.

Referring to FIG. the 1, the first four bits (bits 12-15 in FIG. 1) within an RDS block are used to define the particular group number of the data packet. The fifth bit (bit 11) indicates whether the group is of type A (bit 5=0) or type B (bit 5=1). The sixth bit (bit 10) may be used for highway traffic announcement related indicators, and is referred to as the TP bit. The TP bit along with a subsequent bit known as the TA bit (bit 4) are used to transmit information regarding the availability of a traffic announcement, as illustrated in FIG. 2. Following the TP bit are five PTY bits (bits 5-9) that are used in some data packets to indicate the type of program carried on the FM station, according to the code table shown in FIG. 3. As shown in FIG. 3, the five PTY bits are used to provide a binary value (or bit pattern) that corresponds a particular type of programming that is being broadcast by the FM radio station. The remaining bits may be used to carry additional codes depending upon the type of group.

The use of the RDS data communication capability is expanding as new applications are identified and better coding systems are developed. With increased data encoding capability, additional types of information can be made available for use in a variety applications. An example of expansion of the RDS system capability is illustrated in U.S. Pat. No. 6,411,800 the entire contents of which are hereby incorporated by reference.

SUMMARY

Various embodiments provide systems and methods for integrating an FM receiver into a mobile device to receive FM radio signals so that the Radio Data System (RDS) data within FM radio broadcasts may be monitored to perform an operation, such as activate various applications within the mobile device when a particular RDS data pattern is received. Applications within the mobile device may be launched when various RDS signals are received.

A handheld device includes the capability of receiving FM radio broadcasts, including Radio Data System (RDS) data packets, and is configured to receive RDS data, monitor RDS data packets for particular patterns or flags, and perform an operation in response to receiving an RDS data packet of a recognized pattern or content. The actions initiated may include, for example, activating a dormant application on the handheld device, storing all or a portion of the RDS data packet in memory, notifying an application that RDS data is stored in memory. All FM radio stations may be monitored, such as by selecting an FM frequency band, monitoring RDS data signals for a period of time or number of received RDS data packets, and then selecting another FM frequency band. Initiating an application enables the handheld device to provide a number of useful functions, such as generating a display based on or in response to the RDS data packet, recalling information from memory and generating a display, querying a server to download information, tuning the FM radio receiver to a particular radio station, and placing a telephone call.

A media server may be provided to respond to queries from handheld devices. Such a server may be configured with software to receive a query from a handheld device which includes information based upon or contained within an RDS packet, using the received information to locate and retrieving data files stored in memory or on a data storage medium, formatting information from the retrieved data files for transmission to the handheld device, and transmitting the formatted information to the handheld device. The media server may store any or all of image, video and text data, and may access a broadcaster's server to obtain information for transmission to the handheld device.

A system for communicating information to handheld devices may include the handheld devices, a media server configured to transmit information to the handheld devices and FM radio stations. The system may further include a server coupled to one or more of the FM radio stations that can be accessed by the media server.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 1 is a diagram of an RDS data block.

FIG. 2 is a table of definitions ascribed to the TP and TA bits within RDS data block.

FIG. 3 is a table of programming types encoded within five bits of a RDS data block.

DETAILED DESCRIPTION

Figure 4A:
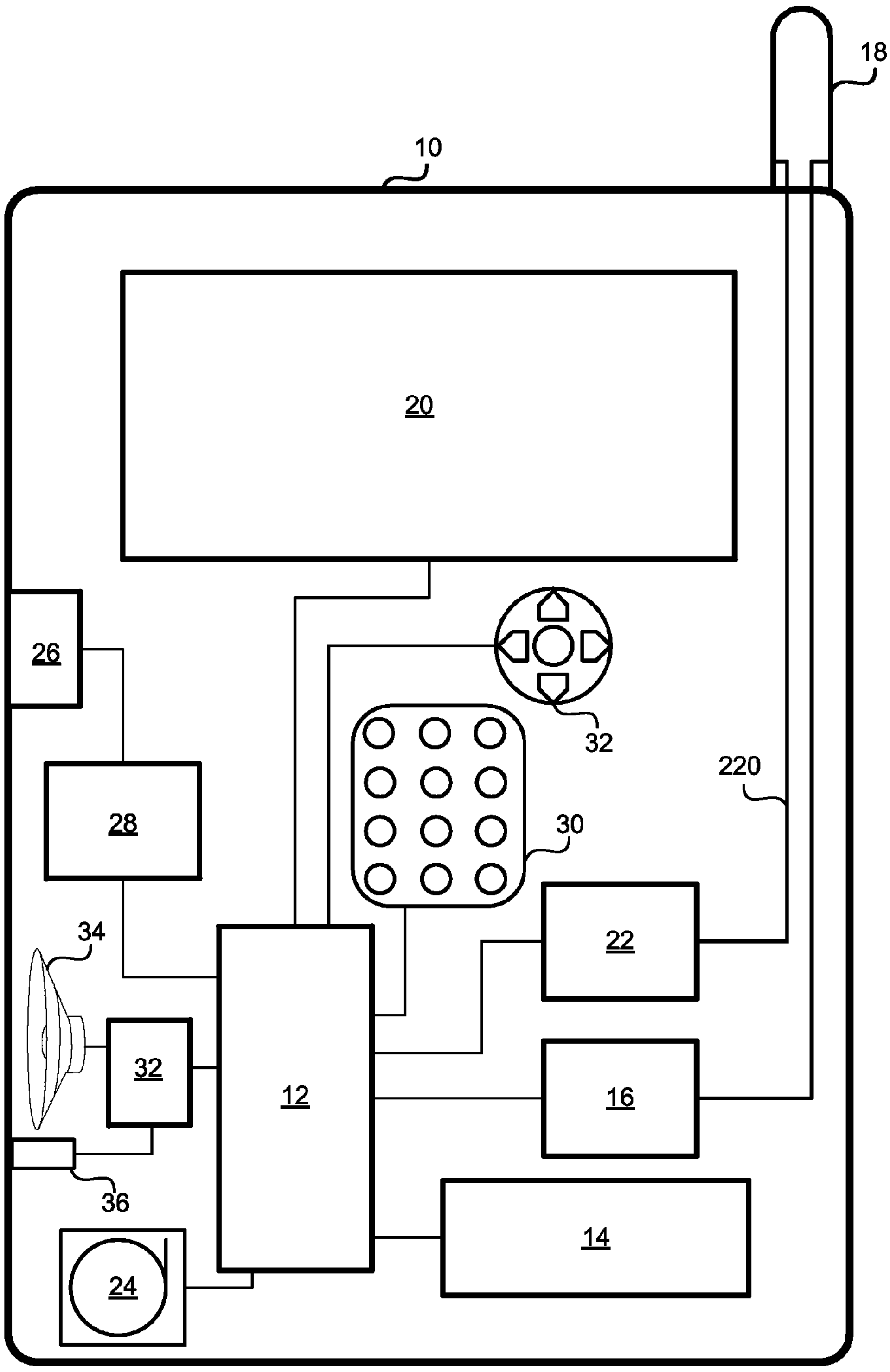
FIG. 4A-4C are component block diagrams of the alternative embodiments of the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "handheld device" refers to any one or all of cellular telephones, personal data assistants (PDA's), palm-top computers, laptop computers, mobile electronic mail receivers, and similar personal electronic devices which include a programmable processor and memory. In a preferred embodiment, the handheld device can communicate via a cellular telephone network, and thus may be referred to as a cellular handheld device. However, cellular telephone communication capability is not necessary in all embodiments. Moreover, wireless data communication may be achieved by the handheld device connecting to a wireless data network (e.g., a WiFi network) instead of a cellular telephone network.

Circuitry for receiving and decoding FM radio broadcasts are now integrated within a single application specific integrated circuit (ASIC). This allows an FM radio to be incorporated within other devices, including cellular handheld devices. Incorporating an FM receiver into a cellular handheld device gives the device multifunctional capability, allowing the user to listen to radio broadcasts when not talking on the phone or while accessing the Internet via the cellular telephone network. Integrating an FM receiver within the cellular handheld device also enables the handheld device to receive the RDS data stream which typically accompanies FM radio broadcasts. The various embodiments disclosed herein make use of the RDS data stream and provide greater functionality within the cellular handheld device.

Conventional cellular handheld devices that incorporate an FM receiver to play FM broadcasts do not receive the RDS stream to provide for interactive services. Instead, conventional handheld devices routinely access a data server associated with a radio station using wireless Internet protocol via a cellular network to download data associated with the FM station's program. In use, such handheld devices must periodically place a wireless IP data call to the radio station server to download information for presentation on the handheld device's display. This adds airtime costs and depletes the battery. Currently, there is no application which makes use of the RDS data stream on cellular handheld devices for this purpose.

While the RDS data stream typically contains information such as the radio station call sign, frequency band and title of program presently playing, the RDS data stream may also carry other data of potential use to listeners. For example, some FM stations include traffic related information in their RDS data streams. As another example, RDS data is capable of carrying an emergency notification code in the five PTY bits, which is represented by the bit pattern "11111" as shown in FIG. 3. By receiving and recognizing this emergency notification code, a handheld device can notify a user that an emergency situation exists. Over time, additional codes and information may be added to the RDS data stream to support additional applications and uses. For example, not all data codes within the PTY bits have been assigned specific meaning. Thus, it is expected that over time, more useful information will be included within the RDS data stream.

Various embodiments provide a handheld device and methods for receiving, decoding and taking action based upon the content of information within RDS data blocks. In particular, specific data contents or bit patterns may be recognized as associated with particular applications stored on the handheld device, and those associated applications may be activated in response to receiving the RDS data.

FIG. 4A shows an embodiment of a handheld device 10. The handheld device 10 includes a programmable processor 12 coupled to a memory 14, and a cellular transceiver 16. The cellular transceiver 16 is connected to an antenna 18 for receiving wireless data communication, such as from a cellular telephone network. As is well known in the cellular telephone technology arts, the wireless transceiver 16 receives electromagnetic signals from a wireless network, such as the cellular telephone network, and converts the information contained with other in those signals to a digital data format which can be processed by the processor 12. Depending upon the type of cellular technology and the particular embodiment, the combination of the transceiver 16 and processor 12 decode the received signals into sound or data information. In the case of a cellular telephone call, the received signals are translated into electrical pulses which are transmitted to a speaker 34, such as by way of an amplifier 32. In the case of a data call, the received signals are translated into digital information which can be processed by the processor 12 and stored in memory 14 and/or displayed on the display 20.

In an alternative embodiment, the handheld device 10 includes a wireless data link transceiver circuit in replace of (or in addition to) the cellular transceiver 16. An illustration of this embodiment would be identical to FIG. 4A except that the cellular transceiver 16 would be a wireless transceiver, and thus differ only in designator on microchip shown in the figure. Accordingly, references herein to cellular telephone network are intended as an example embodiment and not intended to preclude or disclaim other wireless data networks which can be used to achieve the same communication functions.

A handheld device 10 will further include a display 20 coupled to the processor 12 for displaying telephone numbers, text messages, status indicators, menu options and information presented by various applications running on the processor 12. Additionally, a key pad 30 and various menu selector buttons, such as a rocker switch 32, are connected to the processor 12 in order to receive inputs from the user. Handheld devices may also include data ports for connecting to external data sources (like a personal computer), such as a FireWire connector 26 which may be coupled to the processor 12 by a data communication encoding/decoding circuit 28. Frequently, handheld devices 10 are provided with the ability to play audio files, such as with an MP-3 player application provided as part of the software implemented on the processor 12. In order to store the large amount of data associated with audio as well as video files, the handheld device 10 may also include a mass storage memory, such as a miniature disk drive 24, configured to provide data to the processor 12. To support of the MP-3 player function, the handheld device 10 may also include a headphone jack 36 which may be connected to the processor 12 via an amplifier 32.

In the embodiment illustrated in FIG. 4A, the handheld device 10 further includes an FM receiver ASIC 22 coupled to the processor 12. The FM receiver ASIC 22 receives FM radio signals via a conductor 220 coupled to the antenna 18. The FM receiver ASIC 22 receives FM radio of a selected frequency band and decodes the signals to generate a data stream of audio information that the processor 12 can direct to the speaker 34 or headphones 36 via the amplifier 32. Depending upon the particular implementation, the FM receiver ASIC 22 may output a digital signal encoding the FM radio broadcast in a format that the processor 12 can process, or may output an analog signal that can be directed to the amplifier 32 to be translated into sound by the speaker 34 or headphones 36. The FM receiver ASIC 22 can also enable the handheld device 10 to receive the RDS data stream included within the FM broadcast signals.

Figure 4B:
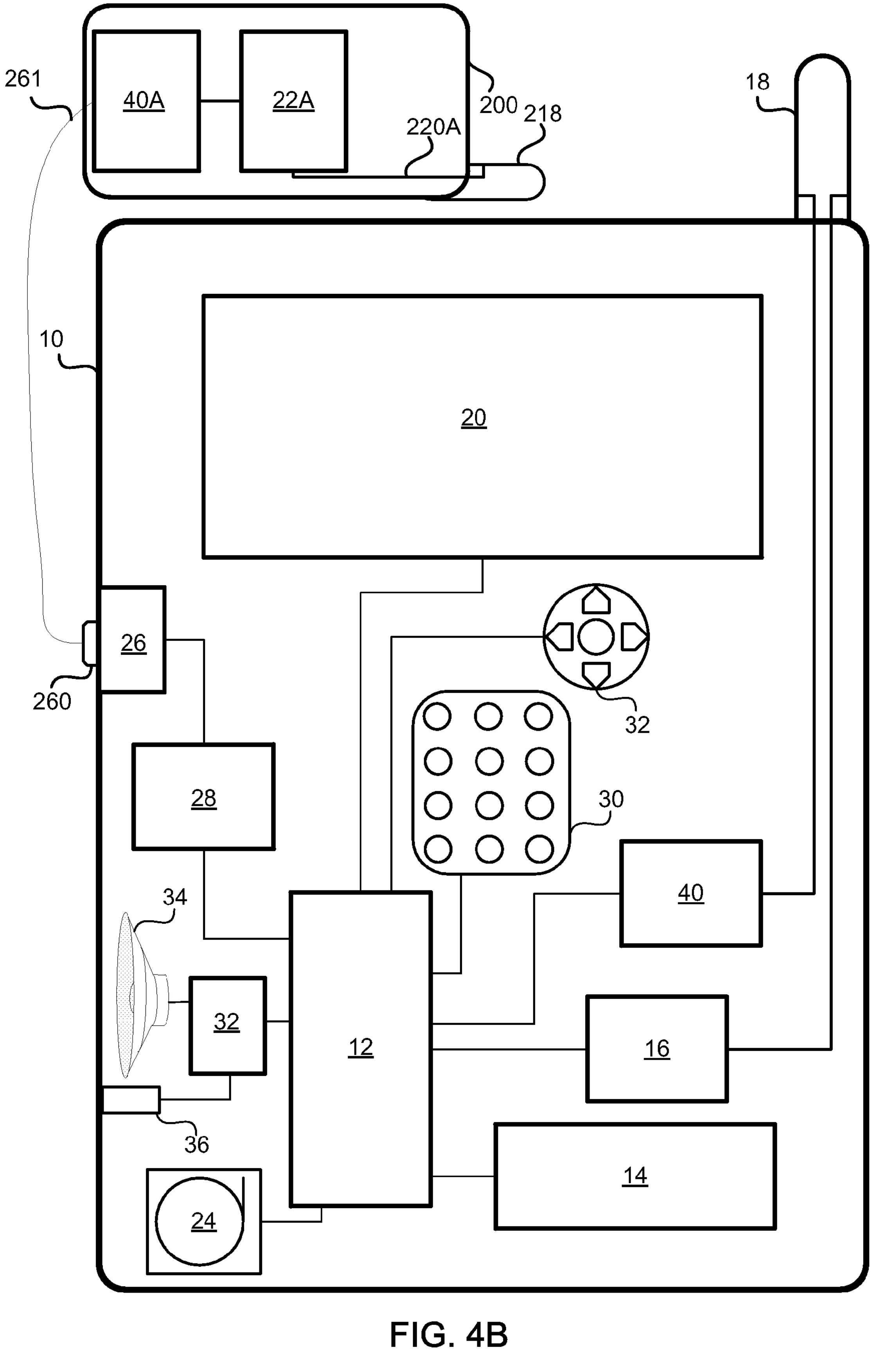
Figure 4C:
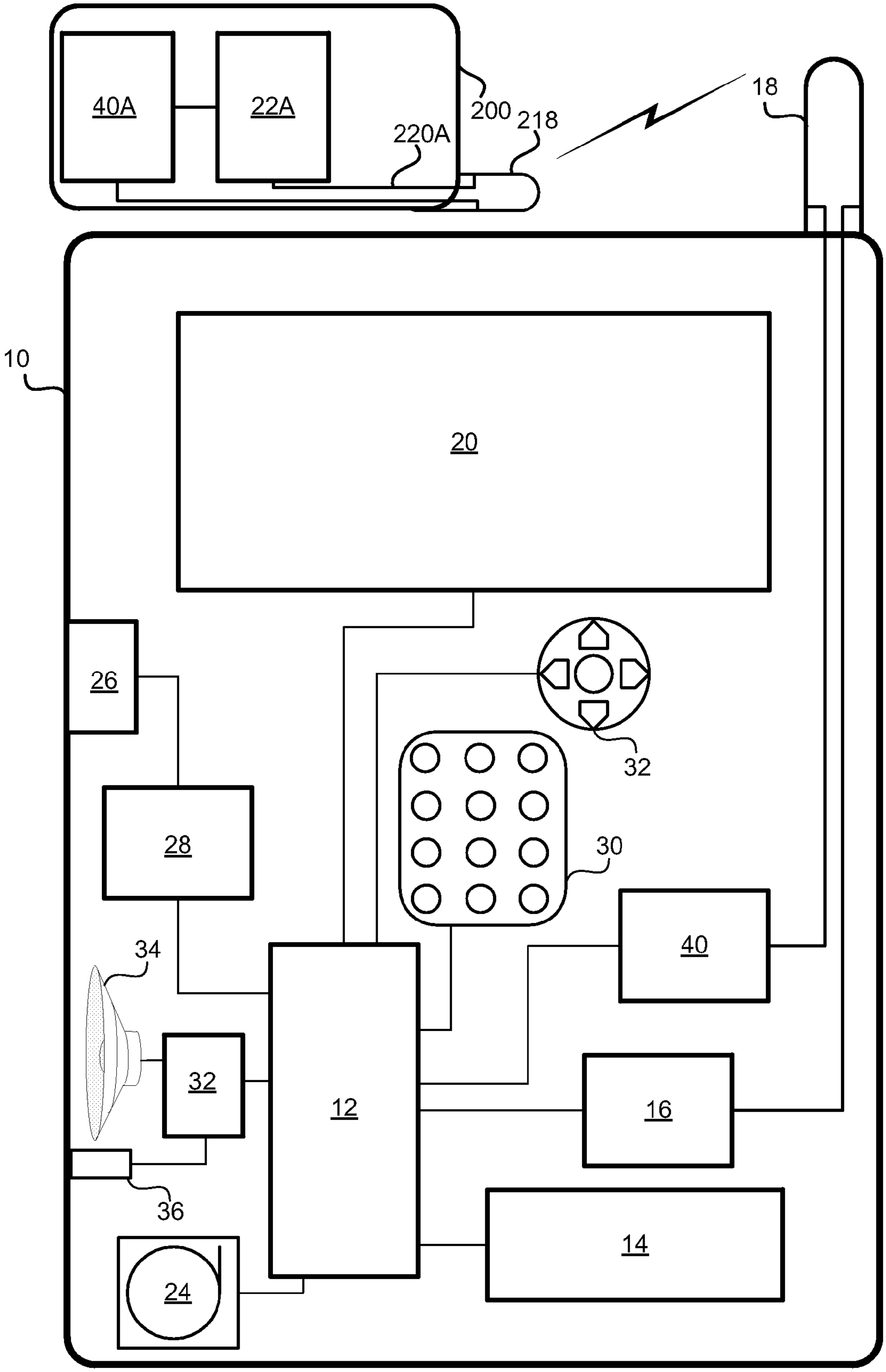

The FM receiver need not be implemented within the handheld device 10, and instead may be provided within an external FM radio receiver 200 as illustrated in FIGS. 4B and 4C. Referring to FIG. 4B, an external FM radio receiver 200 includes an FM receiver ASIC 22A coupled by a connector 220A to an antenna 218. FM radio data may be communicated to the processor 12 within the handheld device 10 by means of a wired data link, such as a FireWire connection comprising a data communication coding and decoding circuit 28A, a data communication cable 261 and a connector 260 coupled to the FireWire receptor jack 26. In use, the FM receiver 200 receives the FM data signals and converts them into data signals that can be received by the handheld device 10, conveying those signals by the FireWire data link (coding and decoding circuit 28A, cable 261, and connector 260). Reference to a FireWire data connector in this embodiment description is for illustrative purposes and is not intended to exclude other suitable wired data connections, such as USB and RS 232 data connections.

Alternatively, the external FM receiver 200 may communicate FM radio broadcast information to the handheld device 10 by a wireless data connection, such as BlueTooth. In this embodiment illustrated in FIG. 4C, the FM radio receiver 200 includes a wireless data link transceiver 40A (e.g., a BlueTooth transceiver circuit) coupled to an antenna 218 in order to transmit the decoded FM radio broadcast information over a short distance wireless data link to the handheld device 10. In order to receive this wireless data signal, the handheld device 10 further includes a BlueTooth transceiver 40 coupled to the antenna 18 and to the processor 12. The BlueTooth transceiver 40A receives the FM broadcast information from the FM receiver ASIC 22 and converts the data into a BlueTooth data link signal which is transmitted by the BlueTooth transceiver 40*a* via the antenna 218. This BlueTooth data link signal is received by the BlueTooth transceiver 40 within the handheld device 10, where it is decoded into digital data that the processor 12 can receive and process. Reference to a BlueTooth wireless data connections in this embodiment description is for illustrative purposes only and is not intended to exclude other suitable wireless data connections, such as infrared or 802.11 Wi-Fi data connections.

Figure 5A:
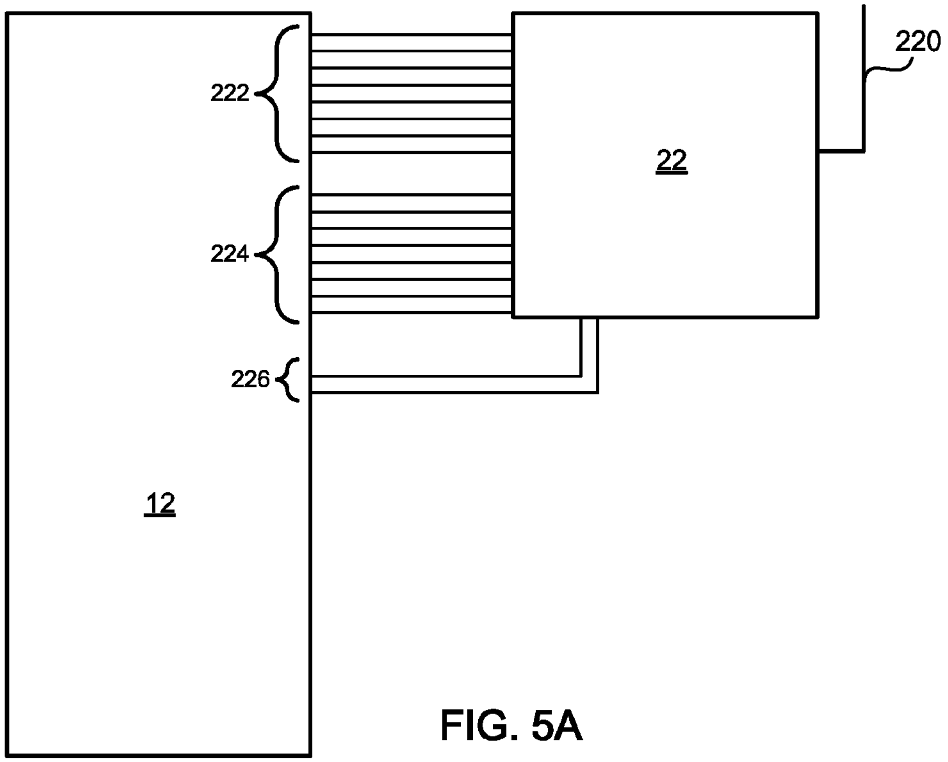
FIGS. 5A and 5B are component block diagrams illustrating alternative embodiments of connections between microchip components of the embodiment illustrated in FIG. 4A.

The FM receiver ASIC 22 can be integrated with the processor 12 of the handheld device 10 in a variety of ways as would be well known to one skilled in the art of digital circuit design. For example, is illustrated in FIG. 5A, the FM receiver ASIC 22 may receive electromagnetic signals via the connection to the antenna 220 and convert those signals into digital data that may be output by a data bus 224 that is coupled directly to the processor 12. In order to control the FM transceiver ASIC 22, the processor 12 may pass command signals to the FM receiver ASIC 22 such as by dedicated control data leads 222. For example, the processor 12 may send control commands to the FM receiver ASIC 22 to select frequency bands, control operating nodes (e.g., mono or stereo output), and to select whether RDS data is to be provided. The FM receiver ASIC 22 may also output the RDS data stream as a separate data output, such as by data leads 226 connected to the processor 12. For example, the FM receiver ASIC 22 may transmit RDS data to the processor 12 via an I2C data bus 226, which is a two-lead serial data bus protocol implemented within many computer systems. In this direct output/input connection configuration, RDS data can be received by the processor 12 in parallel with reception of sound data signals. In an alternative configuration, the same I2C data bus 226 is used to send RDS data in one direction and commands in the other direction, thereby eliminating the need for parallel command leads 222.

Figure 5B:
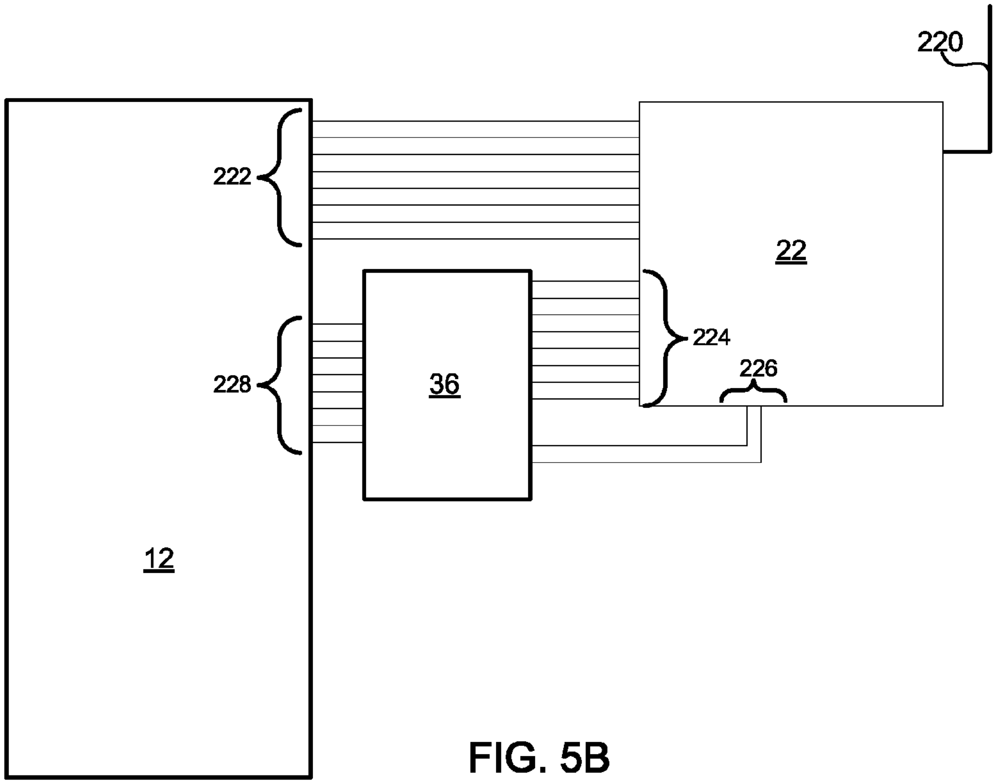

In an alternative configuration illustrated in FIG. 5B, data outputted from the FM receiver ASIC 22 may be passed to the processor 12 by way of a multiplexer or buffer circuit 36. In the illustrated example, FM radio output data is transmitted over the data connection leads 224 to the buffer 36 at the same time that RDS data is transmitted to the buffer 36 by leads 226. The buffer 36 then temporarily holds both the FM radio audio output data and RDS data until data groups (e.g., bytes or larger data blocks) are called by the processor 12 at which point the data is communicated by data leads 228. In this configuration embodiment, fewer data leads are required between the processor 12 and the FM transceiver ASIC 22.

As will be appreciated by one of skill in the art, a variety of data bus protocols may be used to connect the FM receiver ASIC 22 to the processor 12, including parallel data buses 222, 224, serial data buses 226, and multiplexed data buses 228 as illustrated in FIGS. 5A and 5B. Other circuit layout configurations may be used, including serial data connections and multiplexed data busses that may reduce the number of leads connecting the processor 12 to the FM receiver ASIC 22. For example, a multiplexer or switch (not shown) may be used to allow the same input leads to the processor 12 to be used alternately for receiving audio signals and other data from the wireless transceiver 16 (see FIG. 4A) and FM radio audio output data and RDS data from the FM transceiver ASIC 22. It is noted that the embodiment illustrated in FIG. 4C may have a similar connection structure as illustrated in FIG. 5A between the processor 10 and the BlueTooth processor 40.

The processor 12 and its associated memory 14 can be configured with software to utilize RDS data to support or activate a variety of handheld device 10 applications that may be stored in the memory 14 of the handheld device 10. In order to do so, the processor 12 may be configured to monitor the RDS data packets as they are received to identify those containing data relevant to particular applications loaded on the handheld device 10 and, upon finding a data packet containing data of interest, determining which application to activate or notify. Once activated or notified, the appropriate application may make use of some or all of the received RDS data.

Figure 6:
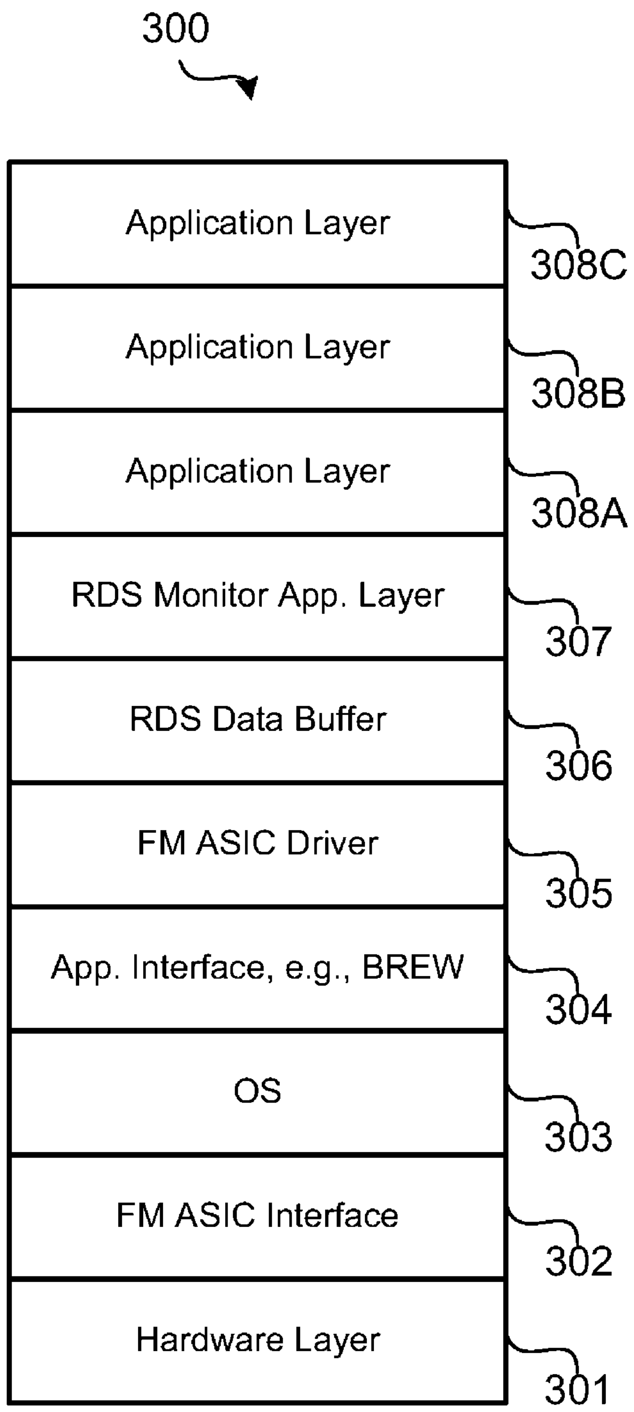
FIG. 6 is a software and hardware architectural diagram of an embodiment.

To support such functionality, the processor 12 and memory 14 within the handheld device 10 may be configured with a hardware/software architecture 300 such as illustrated in FIG. 6. In this architecture 300, a physical interface may be provided between the hardware layer 301 and an FM receiver ASIC layer 302 to enable the processor 12 to receive data from and pass commands to the FM receiver ASIC 22. Above the physical layer 301 will be the operating system layer 303 which may interface with various applications by way of an application interface layer 304, such as the Binary Run-time Environment for Wireless (BREW®) available from Qualcomm, Inc. (BREW® is a registered trademark of Qualcomm, Inc.)

To provide a control output and data input interface with the operating system layer 303 and/or application interface layer 304, an FM ASIC driver layer 305 may be included. The FM ASIC driver layer 305 serves to interpret data coming from the FM receiver ASIC 22, preprocess the received information and place the appropriate data within an RDS data buffer 306. The FM ASIC driver layer 305 may also receive and translate receiver control commands from the operating system layer 303 or application interface layer 304, and translate such commands for reception by the FM receiver ASIC 22. For example, the FM receiver ASIC driver layer 305 may be configured to receive the RDS data from the FM receiver ASIC 22 and break the data packets into blocks or segments that are stored in the RDS data buffer 306. Performing this function within a specific driver layers relieves other applications and the operating system from having to perform this repetitive process that is specific to accessing RDS data. Thus, the operating system, applications interface or applications themselves can be less complex without the need to include software instructions for receiving and processing RDS data, which is functionality that may be used infrequently.

Also included in the software architecture may be an RDS data monitoring application layer 307. This application is configured to inspect received RDS data packets and take action based upon the data, including storing data in the RDS buffer layer 306 if appropriate. In particular, the RDS monitor application layer 307 may be configured to perform processes like those illustrated in FIGS. 7-10 to recognize specific data patterns within the RDS data blocks that indicate a condition, message or data content relevant to particular applications. For example, referring to FIGS. 1 and 2, the RDS data monitoring application may be configured to inspect bit 10 (the TP bit) and bit 4 (the TA bit) to determine if a traffic announcement is currently being broadcast (i.e., both bits equal 1). As another example, referring to FIG. 3, the RDS data monitoring application may be configured to inspect bits 9-5 to recognize if an emergency alert has been issued (i.e., all five bits equal 1). Other examples of data patterns that may be recognized by the RDS monitor application are discussed below.

When the RDS monitor application layer 307 recognizes a data pattern in the RDS data that requires activation of a particular application, the RDS monitor application notifies or activates the particular application stored in memory 14 or already running on the processor 12 in one of the application layers 308A, 308B, 308C. If the notified application requires access to the RDS data stored in the RDS data buffer 306, this data may be accessed directly from the RDS data buffer layer 306 or requested from the RDS monitor application layer 307.

The hardware/software architecture 300 illustrated in FIG. 6 is meant only as an illustration of one example organization of data and software for implementing the various embodiments. As will be appreciated by one of skill and the art of cellular handheld device design and programming, other software/hardware architectures may be used with equal effectiveness.

Receiving, interpreting and acting upon RDS data within the cellular handheld device 10 involves process steps necessitated by the nature of the RDS data stream and practical considerations for making efficient use of the data. For example, not all FM stations transmit RDS data, and rarely do all stations transmit the same data. Therefore, to provide maximum user benefits, the handheld device 10 may need to sweep all FM radio bands, sequentially monitoring each band in search of RDS data packets that maybe related to a particular application. As another example, most RDS data packets do not contain information that will be of relevance to an application, and thus can be discarded with very little processing. Consequently, the handheld device 10 must monitor the RDS data stream for a period of time or a certain number of RDS packets to determine whether there is any information of relevance to an application being broadcast. Since the RDS data rate is low, this monitoring of all RDS data streams takes time to accomplish, but it also allows this process to be accomplished in software with little need for specialized circuitry.

Figure 7:
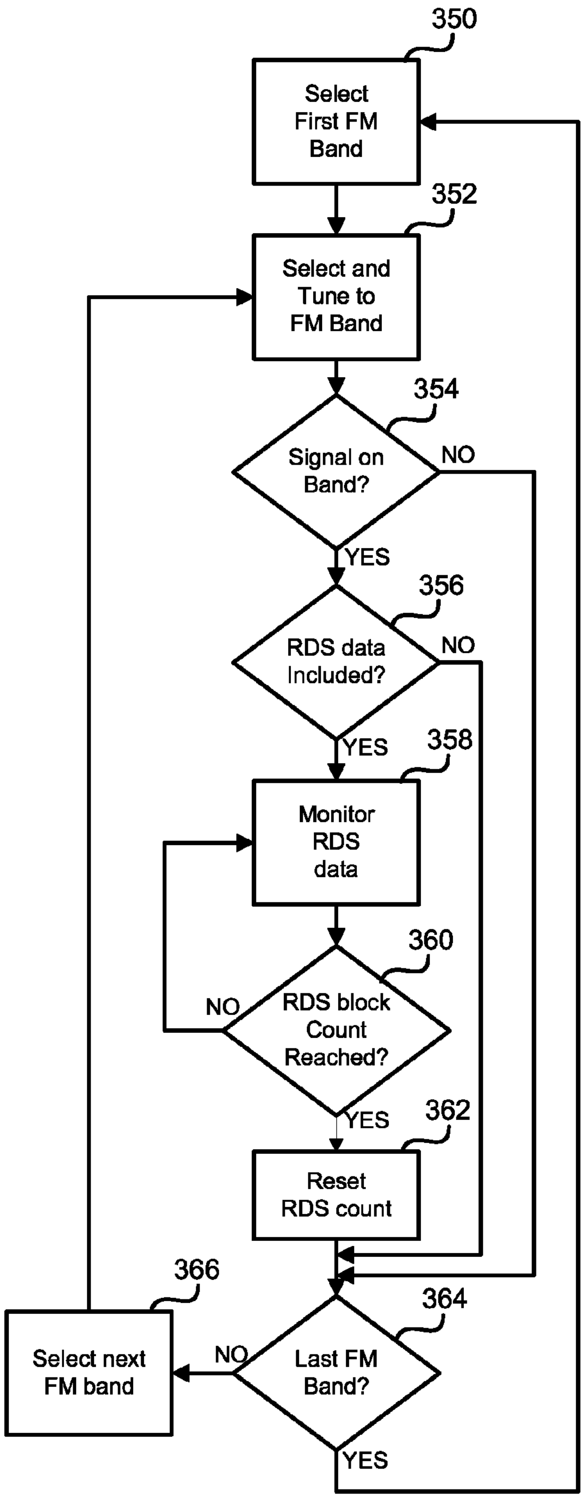
FIG. 7 is a process flow diagram of methods implemented within an embodiment.

FIG. 7 illustrates an example method that may be implemented by software instructions executable on a handheld device 10 for monitoring and reacting to received RDS data. Since the handheld device 10 cannot predict when a relevant RDS data packet may appear in an FM broadcast and all local FM stations may need to be monitored, this example method constitutes an infinite loop which operates as long as the handheld device 10 is configured to monitor RDS data. This method begins with the selection of the first FM broadcast band within the FM radio spectrum, step 350. If the handheld device 10 is not informed of the specific frequency bands of radio stations in the vicinity, the handheld device 10 simply begins at the lowest frequency band allocated to FM broadcasts, namely 87.5 MHz. Within the United States, FM stations are allocated frequency bands separated by 200 kilohertz. Thus, the first FM band is 87.5 MHz and the next band is 87.7 MHz. The highest FM radio band is 108.0 MHz.

With the FM broadcast band selected, the processor 12 directs the FM receiver ASIC 22 to tune in the selected frequency band, step 352. Since there may be no station in the vicinity broadcasting on the selected frequency band, the processor 12 can test to determine whether there is a signal being received on that frequency band, test 354. If there is no FM station transmitting on the selected frequency band, the processor 12 may move on to the next frequency band by executing the loop described further below. However, if an FM station is detected broadcasting on the selected frequency band (i.e., test 354="YES"), the processor 12 may then test for the presence of RDS data to determine if the received FM signal contains an RDS data signal sub-carrier, step 356. This may be indicated by a data or data-available lead on the FM receiver ASIC 22 having a particular value, such as high voltage, if an RDS data signal is detected. Alternatively, the processor 12 may test data leads dedicated to receiving RDS data from the FM receiver ASIC 22 to determine if such data is present. If the processor 12 determines that there is no RDS data signal included in the FM broadcast signal, the next FM band may be selected by executing the loop described further below. However, if RDS data is included in the signal (i.e., test 356="YES"), the processor can begin a loop of software instructions to monitor the RDS data for a predetermined amount of time or number of data blocks, steps 358, 360.

As mentioned above, the handheld device must monitor RDS data stream signals for a period of time or a certain number of data blocks in order to determine whether data of interest to a particular application is present. Since the handheld device 10 cannot know the location of a particular packet within the periodically repeating sequence of various RDS data packets, the device must monitor RDS data packets for a sufficient period of time to confirm that RDS data of interest is not present before the next FM frequency band is selected. This may be achieved by using a timer or a counter which counts the number of received RDS data blocks. If an RDS data packet counter is used, the count can be compared against a predetermined value selected so as to provide a high confidence level that any relevant RDS data packet being transmitted will be received. Thus, while monitoring individual RDS data packets, step 358, the processor 12 can compare the count of data packets received against this predetermined value in test 360 to decide when the next FM frequency band should be selected. Example method steps for monitoring the RDS data and determining when sufficient RDS data packets have been received, steps 358, 360, are described in more detail below with reference to FIG. 8.

Once the count of RDS data blocks received reaches the predetermined value described above, (i.e., test 360="YES"), the processor 12 can execute steps to select the next FM frequency band, see steps 364 and 366. The RDS data block counter may be reset, step 362, since the processor is moving to the next FM frequency band. The presently selected FM frequency band may be compared against the highest FM frequency band, which is 108.0 MHz, to determine if there is another frequency band to be selected, test 364. If the currently selected FM frequency band is less than 108.0 MHz (i.e., not the last frequency band within the FM radio spectrum), the method increments the FM frequency band, step 366, such as by adding 200 kHz to the previous frequency, and then returning to step 352 to tune into the selected FM frequency band. However, if the selected frequency band is the last frequency band within the FM radio spectrum (i.e., 108.0 MHz) test 364 will equal "YES", so the processor 12 will loop back to step 350 to select the first FM frequency band, namely 87.5 MHz, thereby starting the loop over again. As mentioned above, if there is no FM broadcast within the selected frequency band (test 354="NO") or if there is a broadcast on that frequency band but it does not contain RDS data (test 356="NO"), the process flow will move to test 364 to determine if the current frequency band is the last band within the FM radio spectrum. The foregoing description of the embodiment is based upon the FM radio spectrum implemented within the United States, and is used only for illustrative purposes and is not intended to limit the claims to particular frequency bands or spectrum. For example, some countries, such as China, extend the FM band well beyond 108.0 MHz, and many countries allocate 100 kHz bands to FM broadcasters (versus the 200 kHz band used in the United States). Accordingly, the foregoing embodiment and the claims may be implemented for a variety of minimum and maximum frequencies as well as different bandwidth allocations without departing from the spirit of the present invention.

As can be seen in FIG. 7, this method allows the handheld device 10 to continuously scan the FM radio spectrum for FM radio broadcasters that are transmitting RDS data and monitor those RDS transmissions for sufficiently long periods of time to determine if there is information of relevance in the RDS data stream. By continuously looping back to the bottom of the FM radio spectrum, the handheld device 10 ensures that any new transmission of RDS data will be detected within a relatively short period of time.

While the foregoing embodiment checks each FM frequency band for a transmitting station, the method may be further refined so the processor 12 only checks the frequency bands of local FM radio stations or more narrowly, just those FM radio stations which are transmitting RDS data. This refinement may be accomplished by adding a step at some point after test 354 or 356 to store the selected FM frequency band, such as part of the actions of step 362. The FM frequency bands of transmitting FM stations may be stored in a data table that can then be used to select the FM frequency bands to monitor (step 366) in subsequent passes through the loop illustrated in FIG. 7. In this fashion, the processor 12 sequentially selects and monitors only the FM frequency bands stored in the table of FM radio stations. This embodiment will scan the local FM stations broadcasting RDS data much faster than is possible if every FM frequency band must be tested. In order to accommodate changes in available radio stations when the handheld device 10 moves from city to city, a complete scan of all FM frequency bands to refresh the table of FM radio stations may be performed periodically, whenever the handheld device is powered on, or upon some other event or interval.

Figure 8:
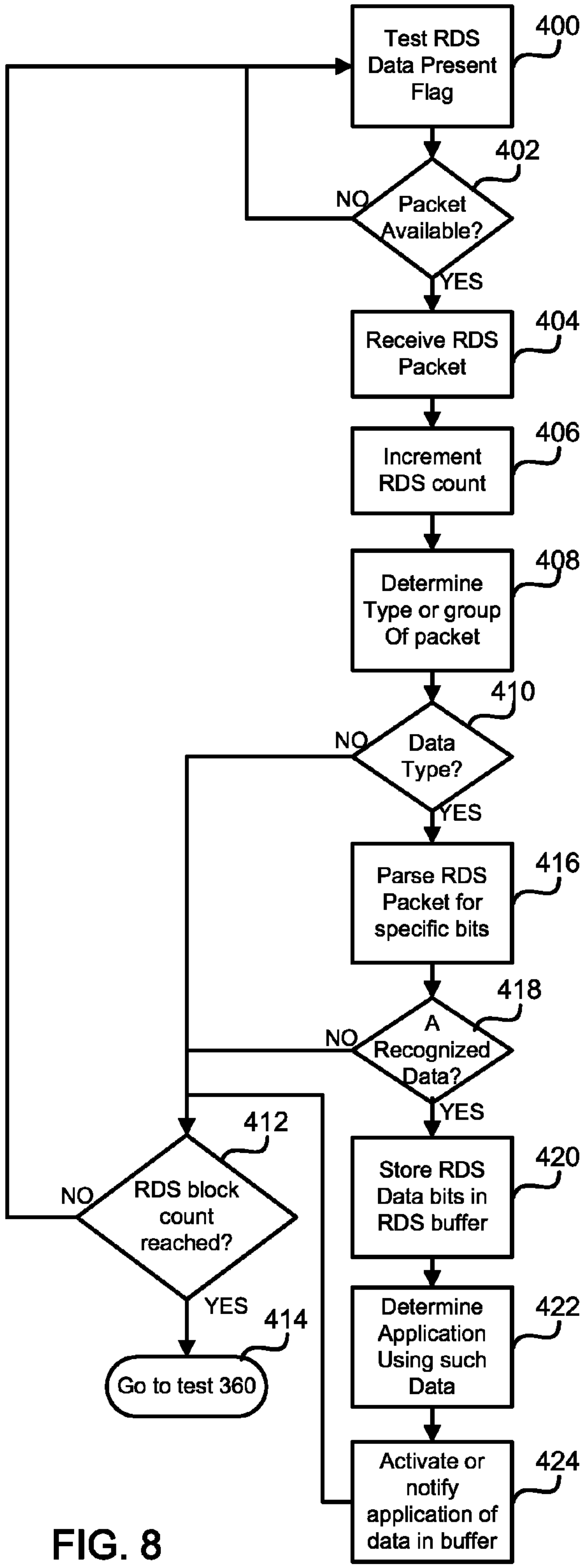
FIG. 8 is a process flow diagram of an embodiment of a portion of the method illustrated in FIG. 7.

FIG. 8 provides further details on examples steps that may be implemented by the handheld device 10 in order to monitor an FM broadcast signal for RDS data of relevance to a particular application. Thus, if a RDS data block is received in steps 358, 360 and 362 above, the processor may implement the steps shown in FIG. 8 to determine if the received RDS data packet contains actionable information for the cellular handheld device. As noted above, this monitoring of RDS data must continue for a sufficient period of time to ensure all RDS data packets within a repeating stream of packets have been examined. FIG. 8 achieves this by counting the number of RDS data blocks received (in an RDS data block counter) and continuing to receive and examine RDS data packets until this number exceeds a predetermined value.

As a first step, the processor 12 may test for the availability of RDS data that can be accessed from the FM receiver ASIC 22 for analysis, step 400. If so configured, the FM receiver ASIC 22 may set a flag, such as by writing a bit (1 or 0) to a particular address location or driving a particular lead to high or low voltage, that the possessor 12 can sense to indicate that a RDS data element is available for delivery to the processor 12. Alternatively, the processor 12 and FM receiver ASIC 22 may be configured to simply pass RDS data directly to the processor or a buffer memory location as it becomes available. This buffer may be a memory register within the memory 14 or may be within random memory within the processor 12 itself. If RDS data is passed directly to a buffer then the step of testing whether RDS data is available, step 400 may be accomplished by simply accessing the data buffer to determine if there is RDS data present. If no RDS data packet is ready for the processor 12, test 402, then the processor may repeat the step of accessing a data present flag and/or testing for the presence of data in a buffer, steps 400, 402, until RDS data is determined to be available for review by the processor 12. If the data packet is available (i.e., test 402="YES"), the processor 12 may accept that RDS data into a buffer for processing, step 404, and increment the RDS data block counter, step 406.

With an RDS data packet stored in a buffer, the processor 12 can test selected bits within the data to determine the RDS data packet type or group, step 408. As described above with reference to FIG. 1, this may be accomplished by reviewing the first four or five bits (bits 11-15) in the RDS data packet to recognize the particular group or type of RDS data packet. If the RDS data packet is not of a type which includes data that may be of interest to an application (e.g., it contains station identification information rather than other useful data), test 410, the processor 12 can skip the RDS data packet by proceeding to test the RDS block counter value against the predetermined value, test 412, to determine whether the count has been reached. If the predetermined count has not been reached (i.e., test 412="NO"), the processor 12 returns to waiting for the next RDS data packet to be received, steps 400, 402. However, if the predetermined count has been reached (i.e., test 412="YES"), the processor 12 selects the next FM frequency band, step 414, by proceeding to test 360 described above with reference to FIG. 7.

If the received RDS data packet is of a type that contains usable data (i.e., test 410="YES"), the data can be parsed to select and review specific bits within the RDS data packet, step 418. Selected bits can be compared against values or patterns stored in memory 14 to determine if a particular pattern is recognized, step 418. In this example embodiment, the bit pattern stored in memory 14 correspond to particular RDS data or message codes which are of interest to applications within the handheld device 10. Such bit patterns may be stored in a data table linking the bit pattern with the corresponding application to which the bit pattern is relevant. If none of these stored data patterns or message codes are present within the RDS data packet, the processor 12 determines if the RDS data block count value has been reached, test 412, and if not, returns to step 400, 402 to await the next RDS data packet.

If an RDS data packet contains a message code that is recognized (i.e., test 418="YES"), this indicates that there is an application stored in memory 14 of the handheld device 10 that should be activated or notified of the presence of the particular RDS data. Accordingly, the RDS data packet (or selected bits) may then be stored within the RDS data buffer, step 420. It is noted that this step may store the entire sixteen bits of RDS data packet in the buffer or just the selected bits based upon the recognized bit pattern.

The processor 12 may then determine the application to be activated or notified of the presence of RDS data in the RDS data buffer, step 422. For example, the stored bit patterns may be correlated in data table to a particular application file name, memory pointer or other locator that the processor 12 can then use to perform an operation, such as activate or notify, the particular application. As noted above, certain bit patterns and the corresponding application file name, memory pointer or other locator may be stored in a data table in memory. Such a data table can be used in a look up procedure to identify the corresponding application by using the selected bits as a look up key (this table look up process essentially comprising steps 418, 420 and 422). Using the determined file name, memory pointer or other locator, the processor 12 can then perform an operation, such as activate or notify, the corresponding application that the RDS data is available for accessing in the RDS data buffer, step 424.

Having processed the RDS data packet and taken the appropriate action of activating a particular application based upon the contents of the RDS data packet, the handheld device 10 can continue to monitor the RDS data stream by testing whether the RDS data block count value has been reached, test 412, and if not, looping back to wait for the next RDS data packet, steps 400, 402. As described above with reference to FIG. 7, once a sufficient number of RDS data blocks have been received to provide a high level of confidence that all RDS data blocks of potential relevance to applications have been received, the processor 12 can move to on to the next FM frequency band by moving to test 360 described above and shown in FIG. 7.

The process described above with reference to FIGS. 7 and 8 is but one example of methods by which the handheld device can monitor RDS data across the entire FM radio spectrum in order to detect particular RDS data packets and perform an operation based upon the data contained within a particular RDS data packet, such activate a particular application or notify a particular application that RDS data is available in the RDS data buffer. A number of other method steps may be implemented to achieve the same purpose and functionality, and the steps may be performed in different order and using different test criteria without departing from the scope and spirit of the present invention.

Figure 9:
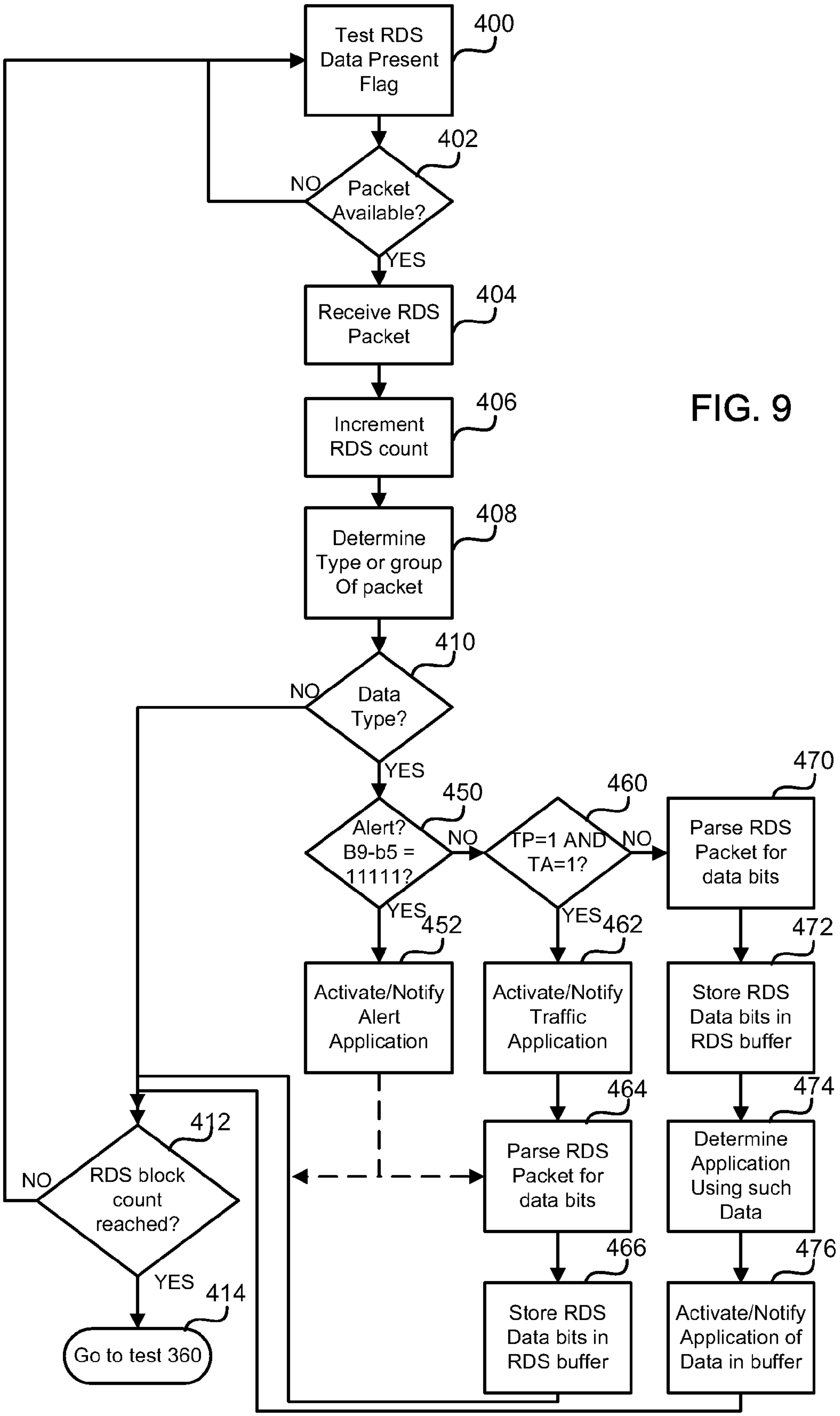
FIG. 9 is a process flow diagram of an alternative embodiment of a portion of the method illustrated in FIG. 7.

The handheld device 10 can be configured with software instructions stored in memory 14 for implementation on the processor 12 to utilize received and recognized RDS data to implement a number of useful applications. For example, FIG. 9 illustrates an embodiment method by which the handheld device 10 can activate an alert application, a traffic advisory application or some other application based upon data in the RDS data packet. This embodiment uses the same steps of receiving, counting, and recognizing data-type RDS data packets as described above with reference to FIG. 8 steps 400-414. This embodiment illustrates how the process of recognizing whether RDS data packets contain particular bit patterns may be accomplished in a sequence of tests, as illustrated in tests 450 and 460. For example, the processor may test bits 9 through 5 to determine if they all equal "1", test 450, which indicates that an alert is being transmitted by the FM radio station transmitting the RDS data. Accordingly, if the result of this test is "YES" then the alert application can be activated if dormant or notified if running, step 452. This alert application may sound an alarm, present a display and do other functions as may be appropriate under the circumstances of an alert. In some implementations, the application may look to data fields within the RDS packet, which is now stored in the RDS buffer, to use the information in the application. For example, in the future RDS data packets may be used to transmit information regarding the type of alert being transmitted, such as whether the alert concerns a weather, terrorist attack, earthquake, or other civil defense event. Alternatively, as indicated in the dashed arrow, the application may have no further use for RDS data, so the handheld device 10 may simply return to the process of monitoring incoming RDS data by executing test 412 and continuing with the rest of the process described above with reference to FIGS. 7 and 8.

If the data contained in bits 5 through 9 did not all equal "1" (i.e., test 450="NO"), then a second test may look to bit 10 and to bit 4 (the TP and TA bits, respectively) to determine if both bits equal one "1", test 460. If they do, this indicates that a traffic advisory is being broadcast by the FM radio station, and accordingly the processor 12 can perform the operation of activating or notifying a traffic application, step 462. For example, this application may activate a GPS application which automatically maps out an alternate route to a destination. In some implementations of RDS (e.g., the Traffic Message Channel (TMC) available in some countries), additional information regarding a particular traffic event and its location may be contained within the RDS data or subsequent RDS data packets. Accordingly, to support a traffic application, the handheld device 10 may parse the RDS data packet to obtain the particular data bits of use to the traffic application, step 464. These data bits may then be stored in the RDS data buffer, step 466, or they can be readily accessed by the traffic application. Having activated the traffic application and stored any relevant data in the RDS data buffer, the application of the handheld device 10 may return to the process of monitoring incoming RDS data by executing test 412 and continuing with the rest of the process described above with reference to FIGS. 7 and 8.

If the results of testing the TP and TA bits reveals that no traffic advisory is presently being broadcast (i.e., test 460="NO"), the handheld device 10 may parse the RDS data packet to obtain selected data bits, step 470, and store some or all of those bits within the RDS buffer, step 472. In doing so, the handheld device 10 also determines whether a particular application should be activated if dormant application or notified if running, based on the received and parsed RDS data, step 474, and notifies that application of the presence of RDS data in the RDS data buffer, step 476. Examples of RDS data packets that do not include either an alert symbol or the traffic advisory symbols are data packets that contain data relevant to either the alert or the traffic notification. For example, in a future implementation of the RDS system, some data packets may identify the type of event, such as by including the alert or traffic notifications symbols, while the subsequent packets (such as D packets) may be used to transmit data relevant to those events (e.g., type and location). Thus, the method illustrated in FIG. 9 may activate the alert or traffic advisory application in response to a particular RDS data packet and then recognize and store relevant data obtained from subsequent data packets by implementing steps 478 through 476 to handle subsequent RDS packets.

Figure 10:
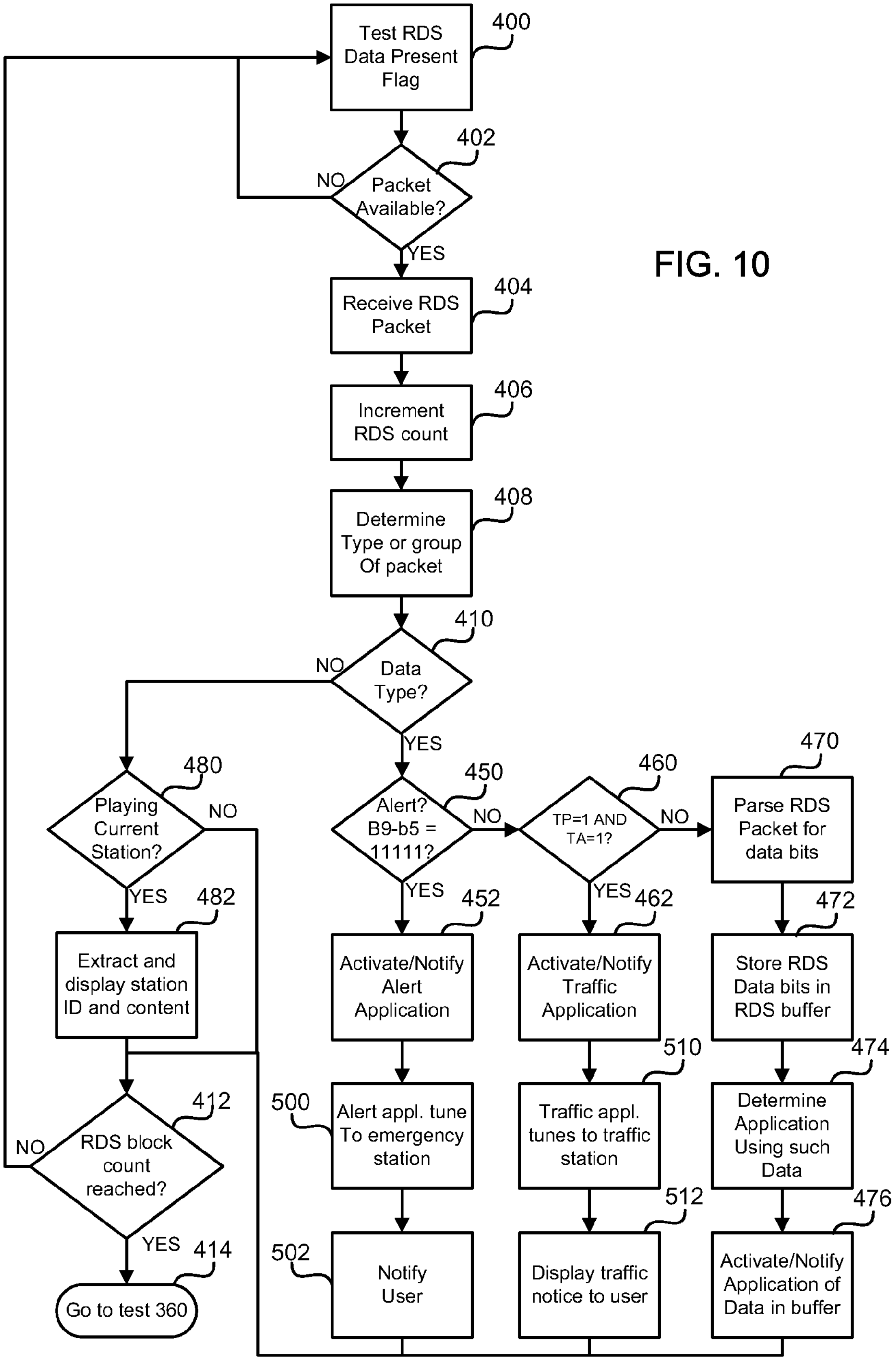
FIG. 10 is a process flow diagram of an alternative embodiment of a portion of the method illustrated in FIG. 7.

In addition to providing the application activation and the data support services of the embodiments described above, a handheld device 10 may also use RDS data for the conventional purpose of displaying information regarding the program being carried on the FM radio broadcast. Thus, if the handheld device 10 is being used to receive and play an FM radio program, the handheld device 10 may directly receive the RDS data and use it to generate an appropriate display as would a conventional FM radio. FIG. 10 illustrates an example embodiment which enables this conventional use of RDS data while also providing the application activation capabilities described above with reference to FIGS. 7-9.

Referring to FIG. 10, this embodiment employs the same steps of receiving, counting, and recognizing data-type RDS data packets as described above with reference to FIG. 8 steps 400-414, as well as the staged bit tests of steps 450, 460. In ordered to accept the RDS data packets including station identification information, additional steps 480 and 482 are included in the method. If an RDS packet is determined not to contain application-useful information in test 410, the station identification information may be extracted from station identification RDS packets and provided to the FM radio application running in the handheld device, step 482 for presentation on the display 20. If the handheld device 10 is configured to continue scanning all FM stations for RDS data even while playing one particular FM radio station, a further test 480 may be implemented to determine if the particular packet was received from the same FM station as it is being currently played on the handheld device. If the RDS data packet is associated with the FM station being played (i.e., test 480="YES"), then the step of extracting and displaying the station identification and program content information may be accomplished, step 482. However if the RDS data packet is not associated with the FM station being listened to (i.e., test 480="NO"), the handheld device 10 simply ignores the packet and proceeds to test 412 and the subsequent process steps described above with reference to FIGS. 7 and 8. Other RDS data packets containing information relevant to the FM radio station program may be identified and stored in the RDS data buffer by the handheld device 10 executing steps 470 through 476 which are described above with reference to FIG. 9. In this manner, the full range of radio program related information contained within the RDS will be obtained and made accessible to the FM radio application.

FIG. 10 also illustrates further options for implementing particular applications. For example, in response to receiving an alert RDS packet (test 450="YES") after activating the alert application, step 452, the handheld device 10 may tune the FM receiver ASIC 22 (22A) to the frequency band of an emergency broadcast, step 500, and notify the user, such as a tone and or visual display, step 502. As another example, if the traffic announcement bits are both equal to one (i.e., test 460="YES"), after activating the traffic application, the handheld device 10 may tune the FM receiver ASIC 22 (22A) to a channel where it can receive traffic information, such as a traffic station, step 510. The application may further present a specific traffic notice display for the user, step 512.

Figure 11:
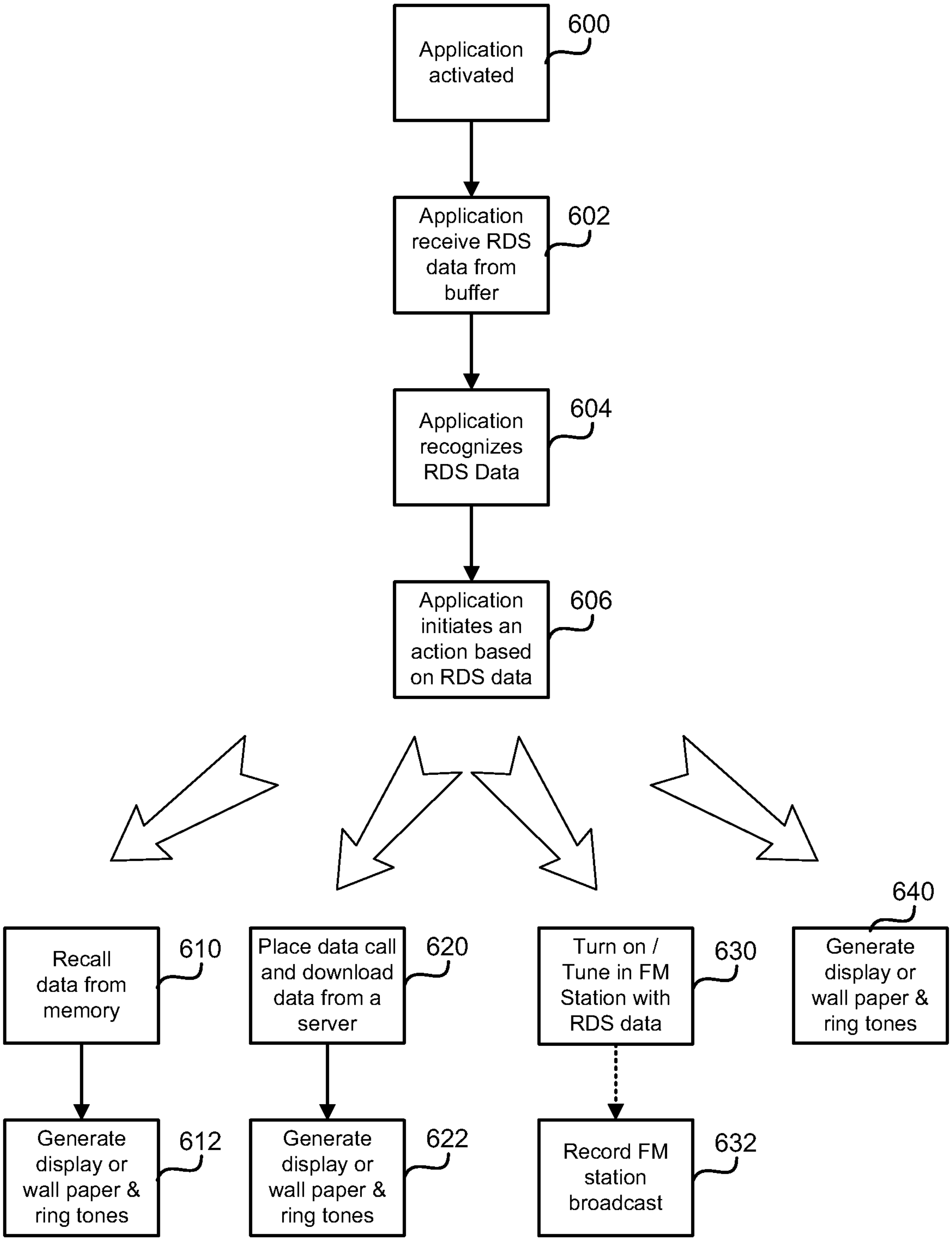
FIG. 11 is a process flow diagram of an application making use of RDS data received according to an embodiment.

By providing the capability to have specific (i.e., relevant) applications notified or activated in response to the reception of particular, relevant RDS data packets, the handheld device 10 of the various embodiments enables a wide range of possible applications. FIG. 11 illustrates a general process flow that may be followed by such handheld device applications. As a first step, a dormant application may be activated, step 600, such as by being loaded from memory 14 into the active software memory within the processor 12. This loading of the relevant application may be implemented by an application interface software, such as BREW®. If the relevant application is already running on the processor 12, it may be signaled to take an action, such as by being notified that RDS data is present in the RDS data buffer.

Once the relevant application activated and/or notified that data is available in the RDS data buffer, the application may access such data, step 602. As noted above this step is optional since some applications will not require any further RDS data once they have been activated. If the application does use some portion of the RDS data, then the application accesses the data from the RDS data buffer and utilizes the data in some fashion, such as to recognize the nature of the data, step 604. Finally, the relevant application initiates some action based upon the fact that it has been activated or notified, or based upon the data obtained from the RDS data buffer, step 606.

A wide variety of applications may be developed and are anticipated within the scope of the present invention. For example, an application may recall certain data from memory 14, step 610, and generate a display, wallpaper or changed ring tones, step 612. An example of such an application is a traffic monitoring application which can present displays of traffic events based upon codes contained within RDS data packets. Some FM stations broadcast traffic and travel information to drivers using the RDS system by including an event code and a location code. The Alert C standard lists 2048 event codes which can be translated by a receiver programmed to interpret those codes. Similarly, commercial companies, such as Tele Atlas, have assigned certain codes to bits and RDS data packet groups which are maintained at the national level in location code tables. These location code tables assign number codes to locations on local road networks. Using such encoded information, a traffic application can determine the type and location of a traffic event from the relatively sparse RDS data packet by comparing the RDS data stored in the RDS data buffer to an event codes table and a location codes table stored in memory 14. Then using the decoded event and location information, the traffic application can generate an appropriate image for presentation on the display 20, such as a map showing the location of the event.

Another example is an application that is activated when received RDS data indicates a particular sports team is being covered on the radio station. The name of the sports team may be included within RDS data packets. An application may be activated that is able to recognize the name of the sports team and, in response to its presence in the RDS data, recall from memory 14 and implement a user configuration including wallpaper and ring tones that are associated with the user's favorite sports team. Thus, for example, if the FM radio station is covering a hockey game featuring the Anaheim Ducks®, the application activated by the RDS data indicating that the program is a sports program featuring the Anaheim Ducks® could present wallpaper and ring tones associated with the team.

Another example application monitors RDS data packets for the names of artists and songs being played by the FM radio station broadcasting the RDS packet data on the selected frequency band. If the user is listening to FM radio on the handheld device 10 and a favorite artist is featured, the application can recognize the artist name from the RDS data containing the artist's name. In response, the application may recall from memory 14 a user configuration which presents the artist's image on the display 20 and changes ring, such as to match the songs of the feature artist. Also, the application may present an image on the display 20 asking whether the user wishes to download the artist's song or album from a music server to the memory 14 of the cellular handheld device 10 for future listening. If the user so desires, the application can then initiate a data call to the music server site to perform the download.

In a different type of application, activation by RDS data may prompt the application to recall information from an external information source, such as by accessing a particular Internet server to download data relevant to the application, step 620. Using the downloaded data, the application may then generate a display or change wallpapers or ring tones, step 622. In this example, the address for the data server may be included within the RDS data stored in the RDS data buffer. An example of such an application could be the traffic application in which case the application may obtain information regarding the traffic alert and potential alternative routes by accessing an Internet server containing traffic information. In this example, the generated display may be an alternative route or driving directions to bypass the traffic problem. In another example, the alert application may access a weather server to download information related to a weather alert, step 620, and generate a display indicating the updated weather forecasts and any associated warnings, step 622.

Another example of this type of an application is a navigation application which uses a Global Positioning System (GPS) receiver (not shown) included within the handheld device. When the processor 12 recognizes a traffic advisory RDS data packet, the navigation application may be activated (i.e., woken up or loaded into memory) which then turns on the GPS receiver and receive GPS signals to allow the navigation application to determine its position and direction of travel (such as if the handheld device 10 is in a moving car). Then, by comparing its position to the location of the traffic event, the navigation application may access memory to generate a map including driving directions for bypassing the traffic problem. The navigation application may also access other sources of information, such as by making a data call to an Internet server to download traffic information or receive traffic information via other wireless data services.

An RDS data activated application may simply turn on or tune the FM receiver ASIC 22A to the frequency band of the FM station in order to allow the broadcast program to begin playing, step 630. For example, if the application is configured to recognize a favorite song or artist based upon the artist's name or song title presented in the RDS data, the application could turn on the FM receiver ASIC 22 (22A) and tune it to the frequency band of the FM station that is playing that the artist or song. In this way, a user can be sure to always hear a favorite song or artist no matter which radio station the FM receiver ASIC 22 (22A) happens to be tuned to (provided of course that the station is broadcasting the artist's name or a song titles in RDS data).

Another example application monitors RDS data packets from all FM radio stations broadcasting the RDS packet data watching for the name of an artist, song or a number of songs for which the user has indicated a desire to record or download. In this manner the application effectively "scans" all (or a subset of) FM stations in the background looking for matches to the user's preferences for songs or artists. When received RDS data matches an artist or song title identified by the user, the RDS data activated application may simply turn on and/or tune the FM receiver ASIC 22A to the frequency band of the FM station transmitting the matched RDS data in order to allow the broadcast program to begin playing, step 630. In addition, the RDS data activated application may record the broadcast program (i.e., the song), such as in an MP3 audio file format stored in memory 14, 24, optional step 632. This application allows users to build a play list of favorite music recordings for their own personal by selectively recording music that is played on FM stations that broadcast RDS data.

A further example of an application is one that simply generates a display, wallpaper or that changes ring tones, step 640. Such applications simply make the user aware of a particular situation based on information in the RDS data. An example of such an application is the FM radio player application providing conventional RDS data displays on the handheld device.

With an expansion of the RDS system, such as including more data codes and enabling third parties to insert data into selected RDS data packets may enable even further applications. Different RDS data patterns (referred to herein as RDS flags) can be used to activate a variety of different applications that may be developed. For example, a new RDS flag may be configured to prompt an application to cause the handheld device 10 to place a call to a telephone number, such as a dispatcher, operator or a recorded message (such as an emergency message). As another example, an RDS flag may be configured prompt handheld devices to contact a server to download an application, such as a software update, or to delete an application from the handheld device's memory 14, such as an expired or recalled software package. In this example, the RDS flag may indicate that an application update is ready for download. Alternatively, the RDS flag may activate an application that causes the handheld device 10 to access a server which informs the application of software and data updates available for download and software or data that should be deleted.

The foregoing example application embodiments are provided only for illustrative purposes, and are not intended to limit the scope of applications that may be implemented on handheld devices of the various embodiments.

By providing handheld devices with the capability to access content on an Internet server in response to RDS data, the RDS data monitoring capability combined with data calls to an Internet server can turn FM radio broadcasts into a multimedia experience without the need to provide real-time streaming video by the server. An IP address, pointer, or other data code may be included in the RDS message that a handheld device application can use to access data on a particular Internet server that is relevant to the current radio program. The server may have stored on it or be coupled to a database having stored on it image, video and text files relevant to a broad range of popular topics or programs on FM radio stations, such as images, video and statistical information related to popular recording artists, professional athletes, sports teams, politicians, criminals, actors, comedians, etc. The server can be configured with software to recognize codes or data that is included in RDS messages and provided to the server by the handheld device 10 in a data call, and response to such codes or data determine appropriate image, video and text data to download to the handheld device.

Figure 12:
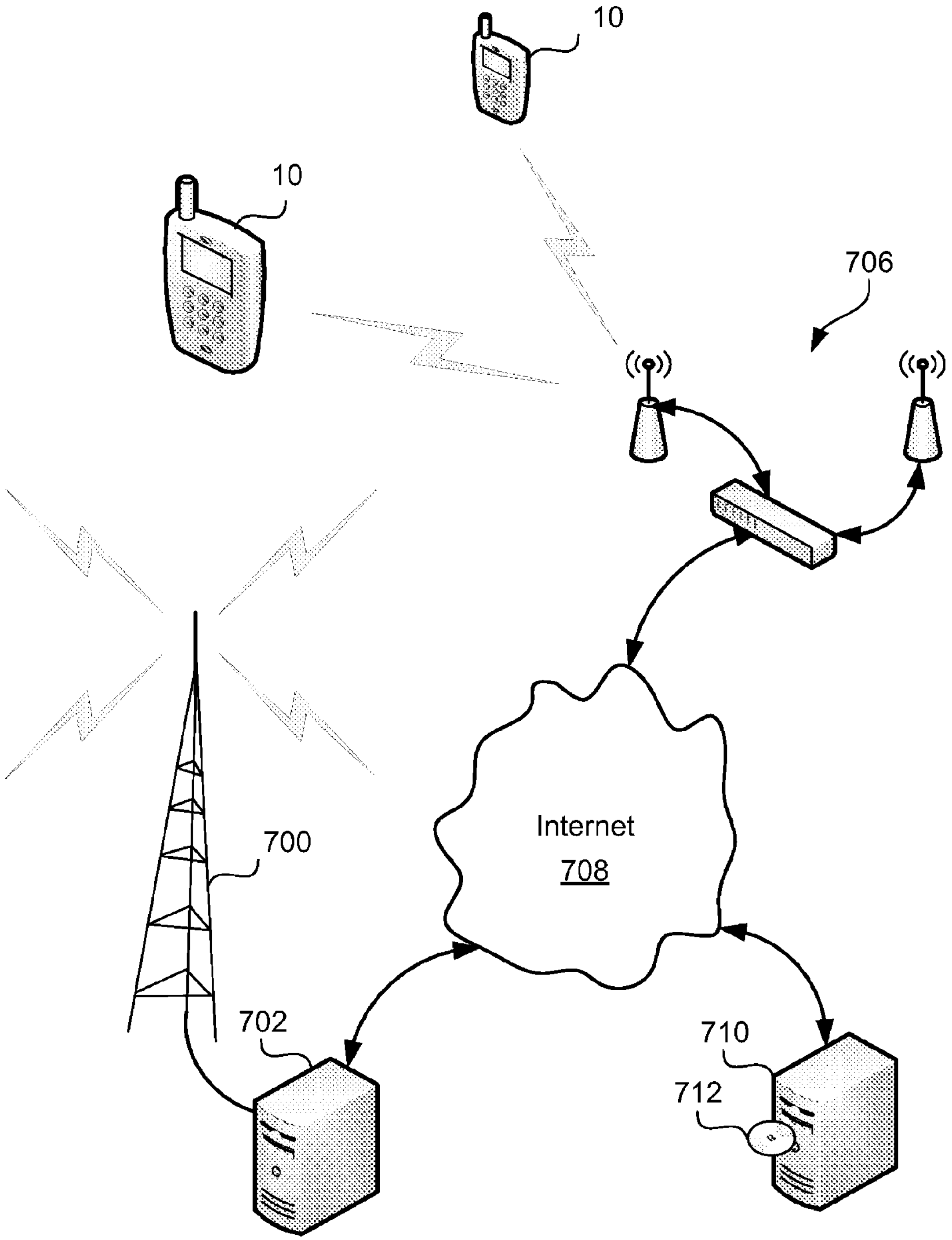
FIG. 12 illustrates an embodiment system which provides RDS packet data to cellular handheld devices and allows the handheld devices to access servers for additional information.

This system embodiment is illustrated in FIG. 12. The system includes conventional FM radio stations 700, which may have a broadcaster's server 702 coupled to the Internet that can be accessed to obtain information regarding the broadcast program. Handheld devices 10 according to one of the foregoing device embodiments include FM receiver circuits so they can receive FM broadcasts transmitted by the FM radio stations 700. The handheld devices 10 are also capable of making data calls via a cellular telephone network 706 to connect to the Internet 708 and access a media server 710 via IP protocols. The technologies, protocols and circuit elements by which the handheld devices 10 make data calls to the media server 710 via the cellular telephone network 706 and the Internet are all well known and commercially available, and therefore require no further description. While FIG. 12 shows handheld devices 10 coupled to a cellular telephone network 706, the handheld devices 10 may also or alternatively connect to a wireless (e.g., WiFi) data network which will also consist of dispersed communication towers as shown in FIG. 12 (and thus would be illustrated identically with the exception of a different identifier for the wireless network).

The media server 710 includes a programmable processor coupled to a data storage medium (not separately shown) as is common in commercially available servers. The data storage medium may be an internal hard disc and/or an external large capacity disc drive which are well known and commercially available (i.e., the term "data storage medium" encompasses both internal and external storage capacity coupled to the server). The media server 710 has stored on the data storage medium an extensive data base of image, video and text information related to a broad range of subject matter that is indexed in a manner that allows quick access based upon subject matter codes or data that may be included within RDS messages. Such image, video and text information may be specially configured for transmission to and display on handheld devices. For example, images and video may be selected and formatted to be compatible with handheld devices, such as abbreviated text and close ups images at lower resolution that can fit and be easily viewed on the small display 20 of handheld devices.

Figure 13:
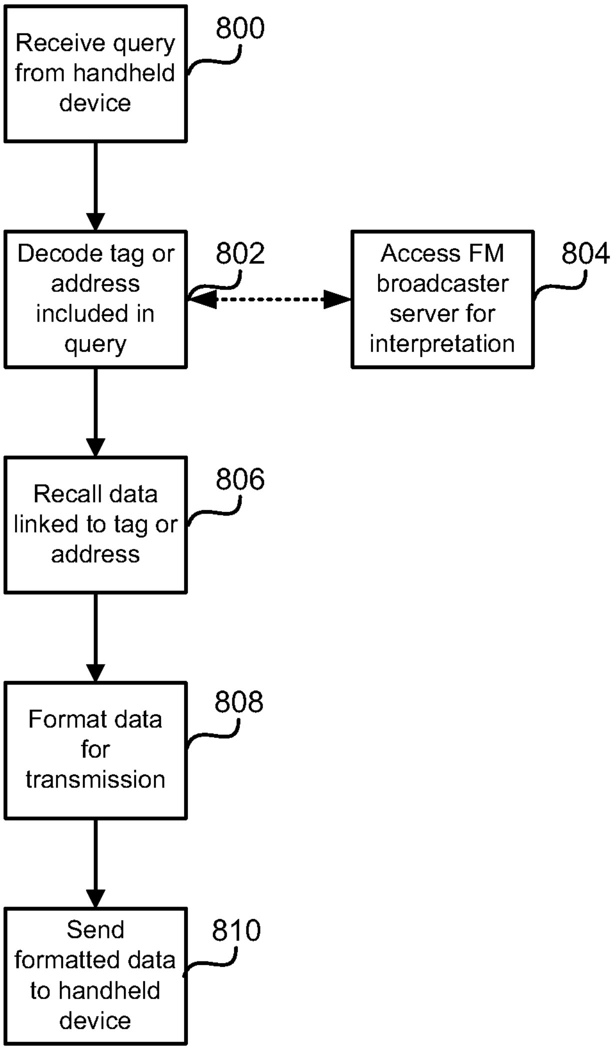
FIG. 13 is a process flow diagram of the steps that a media server may implement to transmit of media data to a handheld device.

The media server 710 is further configured with software that causes the server 710 to receive data requests from a handheld device 10 prompted by or containing RDS data, recall particular image, video and text data from the data storage medium in response to the data request, and transmit the recalled information to the handheld device using IP protocols. An embodiment of processes that may be implemented on the media server 710 via software is illustrated in FIG. 13. The software used to configure the media server 710 may be stored in the server memory and/or other tangible server-readable memory, such a compact disc 712.

Referring to FIG. 13, the media server 710 receives an IP query (e.g., a GET message) from the handheld device via the Internet, step 800. This query 800 includes a tag, pointer, address, code or other indicator interpretable by the media server 710 to identify corresponding data files stored in the data storage medium. The media server 710 interprets the tag, pointer, address, code or other indicator obtained from the query to determine the files to be recalled from memory. For example, if the query includes an IP address or memory location for the data, the media server 710 merely interprets the data as an address. However, the tag included in the query may be a short code that can be used as a table look up key or interpreted in an algorithm to determine the memory location for the associated data files.

In an embodiment, the media server 710 may optionally access a broadcaster's server 702 maintained by the particular FM radio station that transmitted the RDS data received by handheld device 10 to obtain information to interpret the tag or code received in the query, optional step 804. In doing so, the media server 710 may provide the received tag or code and receive in response a more complete description of the data that is being requested. Thus, the broadcaster can include a short code (e.g., 3 to 5 bits of data) in the RDS data that the media server 710 can interpret with assistance from the broadcaster's server 702. In this step, the broadcaster's server 702 may also download to the media server 710 additional image, video and/or text data that can be sent to the handheld devices 10.

Having interpreted the tag, pointer, address, or code in the query, the media server 710 recalls the associated data from the data storage medium (e.g., by accessing the database), step 806, and formats the data into IP packets for transmission to the handheld device, step 808. In this step of formatting, the media server 710 may sequence images and data according to formatting instructions associated with the data. In this manner, the content provider (i.e., the owner of the image, video and text data) may control the sequence in which images and information are displayed on the user's handheld devices 10. Finally, the media server 710 transmits the formatted data to the handheld device 10 using standard wireless Internet data transmission protocols and networks, step 810.

In an embodiment, the media server 710 may also receive other information regarding the broadcaster's server 702, such as a play list or program outline, from the broadcaster's server in step 804 that allows the media server 710 to anticipate the next request from the handheld device 10. Knowing the broadcaster's play list or program outline may enable the media server 710 to prefetch and preformat information that is likely to be requested by a handheld device 10 so the information can be sent promptly after a request is received. For example, a query to the media server 710 may identify the FM radio station that the handheld device is monitoring, so the media server 710 can download the play list (or at least the next song) from the broadcaster's server 702 in step 804 and use the play list to prefetch information relevant to the next song or artist anticipating that the handheld device will soon request such data.

In a further embodiment, the media server 710 may receive a request for lyrics data that includes the song title RDS tag, step 800, and use this data to recall lyrics data from the data storage medium (e.g., by accessing the database) associated with the particular song being broadcast by the FM station 700, step 806. As with the foregoing embodiment description, the media server 710 will format the lyrics data into IP packets for transmission to the handheld device, step 808, and then transmit the data to the handheld device 10, step 810. Upon reception, the handheld device 10, may present the lyrics on the display more or less synchronized with the music being broadcast by the FM station 700.

In the foregoing embodiment, it should be appreciated that the handheld device 10 may request information based upon any form of data in the RDS data stream, and not just the particular program that is playing. For example, some FM broadcasters include information on the next song or artist, so the handheld device 10 may interpret this information and use it to request data associated with the next song from the media server 710, and thus be ready to display the information when the next song comes on (which the handheld device will recognize based upon the RDS data).

A variety of implementations of this system are possible. For example, RDS data may be used by an application to download images, video and text data regarding a particular artist for presentation on the device's display during the time the artist's song is playing on the radio. Special video clips could be downloaded for display on the handheld device which like music videos are intended to enhance the user's entertainment experience but unlike music videos are not synched to the audio program, thereby making them suitable for downloading and display n handheld devices. In this manner, the handheld device 10 in cooperation with the media server 710 is able to provide a multimedia entertainment experience while playing the FM station.

As another example, RDS data may contain the name of a particular athlete at bat (in a baseball game) or being discussed by radio commentators. Using this RDS data, the application can download images, video and text data (such as the athlete's statistics) for presentation on the display 20 on the handheld device 10. Alternatively or in addition, the handheld device 10 may download from the media server 710 images, video and text data associated with one or both of the teams. As a further example, if RDS data indicates major scoring events, such as a home run or touch down, the application may activate the vibration generator in the handheld device in addition to sounding a tone (e.g., a cheer) to provide a multi-sensory entertainment experience.

As another example, political parties may prepare image, video and text data packages for storage on the media server 710 which can be downloaded for display on the handheld device 10 when a particular candidate or political issue is being discussed on the FM station. For example, when a particular candidate is being interviewed, the handheld device may display a picture of the person and/or display a website or phone number to call for more information or to make a contribution. Similarly, if a political advertisement is being broadcast, RDS data related to the advertisement can be used by the handheld device 10 to download additional information from the media server 710.

In yet another example, advertisements and public service announcements run on the FM station may be tied to RDS data to enable the handheld device 10 to download additional information from the media server 710. For example, advertisers may post images on the media server 710 to be downloaded to handheld devices 10 whenever one of their advertisements is aired, thereby turning FM broadcast advertisements into an audiovisual experience. Advertisers may also want to push downloads of displays and information to enable consumers to purchase their products. For example, a map image may be downloaded to the handheld device directing customers to the location of the advertised business. As another example, a website or Java applet may be downloaded to the handheld device to enable a user to purchase the product immediately, such as by accessing the website and making an on-line purchase via a browser, or transmitting a purchase message directly (e.g., by activating a Java applet). Additionally, since RDS data is transmitted only within the reach of the FM radio station, advertisers can use this capability to provide city-specific or local content to the handheld device, even from a centrally located media server 710.

In a further embodiment, FM stations may include calendar and contact information in RDS data that are transmitted along with advertisements. With this additional information in the RDS data stream, applications can be provided that prompt users to store the calendar or information in a calendar and/or contacts database on the mobile device. Such applications would allow users to act on the RDS-transmitted advertisement, such as storing a reminder in a calendar application or dialing a contact number. For example, if an advertisement concerns an upcoming concert or event, users who want to attend or be reminded of the event can the date in their calendar, such as by pressing a button. Similarly, RDS data could be used to transmit contact information for a vendor (e.g., a phone number, e-mail address or Internet address). Users interested in contacting vendors can then save the contact information or immediately contact the vendor such as by pressing a softkey or button, freeing them from the need to memorize a phone number or address. By pressing a softkey or button, users can store the contact information associated with the ad for later retrieval.

The various embodiments allow the RDS data service to tie broadcast audio programs to static data stored in a server so that the combination presented on the handheld device 10 appears as an integrated entertainment experience without the need for streaming video feeds from the media server 710. Further, the media server 710 does not have to be hosted by the broadcaster. The result of the foregoing system embodiments could be a system for delivering audio and visual information that is third form of media that is a mix of radio and television. Further, the image, video and text information may be provided by a company or party that is not associated with the FM broadcaster, and supports all broadcasters, such as a cellular telephone service provider. Further, the media server 710 may be located anywhere, such as in a server farm providing a service to all handheld devices 10 no matter where they are located.

The various embodiments provide a number of advantages. For one, the capability of activating a dormant application upon receiving a particular RDS data packet can allow the handheld device to conserve power since the application can remain dormant until required. Since the FM receiver may be external to the handset (see FIGS. 4B, 4C) or a silicon-based ASIC (see FIG. 4A), this receiver draws less power than other circuits that might otherwise have to remain energized to provide the functionality of the dormant application. For example, the navigation application described above may use GPS receiver circuitry and access external data sources (such as by activating an additional wireless receiver or making a data call to an Internet server) which will draw significant power. Activating such applications and circuitry only when there is a traffic event to be avoided conserves power during times when there are no traffic issues. Without this capability, periodic data calls to a traffic server will need to be made or other wireless receivers may have to remain energized in order to monitor for traffic problems which may not develop.

For another, an affordable and efficient emergency warning system can be incorporated into cell phones. Since a very large percentage of the population has a cell phone near them at any given moment, cell phones could be a very effective way to warn citizens and provide them instructions or guidance in the event of an emergency. Since the Emergency Broadcast System is already integrated with FM stations, adding the capabilities of the various embodiments to cell phones would establish a broadly distributed and effective emergency warning system at very low cost.

A further advantage is the opportunity for a service provider to enhance the FM radio listening experience by providing further services and entertainment to the listener without the need to invest in new broadcast and network infrastructure.

The hardware used to implement the events of the forgoing embodiments may be processing elements and memory elements configured to execute a set of instructions, wherein the set of instructions are for performing method steps corresponding to the above events. Alternatively, some steps or methods may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip in separate memory chips, and combination of different types of memory such as flash memory and RAM memory. References herein to the memory of a mobile device are intended to encompass any one or all memory modules within the mobile device without limitation to a particular configuration, type or packaging. An exemplary storage medium is coupled to a processor in either the mobile handset or the server such that the processor can read information from, and write information to, the storage medium. In the alternative, the storage medium may be integral to the processor. The processor and the storage medium may reside in an ASIC. The ASIC may reside in a user terminal. In the alternative, the server processor and the storage medium may reside as discrete components in a user terminal.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A handheld device, comprising:
- a memory;
- a global positioning system (GPS) receiver;
- a wireless network transceiver;
- an FM receiver circuit; and
- a processor coupled to the FM receiver the memory and the wireless network transceiver, wherein the processor is configured with software instructions to perform steps comprising:
  - selecting a frequency band on the FM receiver circuit;
  - receiving Radio Data System (RDS) data;
  - recognizing a particular information contained within an RDS data packet;
  - performing an operation on an application residing on the handheld device based upon information contained within the RDS data packet containing the recognized particular information; and
  - generating navigation information based on the information contained within the RDS data packet containing the recognized particular information and a position and a direction of travel of the handheld device calculated based on signals received via the GPS receiver.

2. The handheld device of claim 1, wherein the processor is configured with software instructions to perform steps further comprising:
- storing at least a portion of the RDS data packet in the memory.

3. The handheld device of claim 1, wherein the performed operation comprises activating a dormant application.

4. The handheld device of claim 2, wherein the performed operation comprises notifying an active application that at least a portion of the RDS data packet is stored in memory.

5. The handheld device of claim 1, further comprising:
- a display coupled to the processor, wherein the performed operation comprises generating an image presented on the display.

6. The handheld device of claim 1, further comprising:
- a display coupled to the processor, wherein the performed operation comprises activating an application that recalls data stored in the memory and generating an image presented on the display.

7. The handheld device of claim 1, wherein the processor is configured with software instructions to perform steps further comprising:
- initiating a data call via the wireless network transceiver.

8. The handheld device of claim 1, wherein the processor is configured with software instructions to perform steps further comprising:
- initiating a telephone call via the wireless network transceiver.

9. The handheld device of claim 1, wherein the processor is configured with software instructions to perform steps further comprising:

transmitting a query to a media server via the wireless network transceiver including at least a portion of the information contained within the RDS data; and receiving data from the media server in response to the query.

10. The handheld device of claim 1, further comprising:

a display coupled to the processor, wherein the processor is further configured with software instructions to perform steps further comprising:

transmitting a query to a media server via the wireless network transceiver including at least a portion of the information contained within the RDS data;

receiving data from the media server in response to the query; and generating an image presented on the display based upon the received data.

11. The handheld device of claim 1, wherein the processor is configured with software instructions to perform steps further comprising:

monitoring all receivable FM radio broadcasts for RDS data.

12. The handheld device of claim 1, further comprising a wired data communication circuit coupled to the processor, wherein the FM receiver circuit is positioned within a separate FM receiver device that is coupled to the processor by the wired data communication circuit.

13. The handheld device of claim 1, further comprising a short range wireless data communication circuit coupled to the processor, wherein the FM receiver circuit is positioned within a separate FM receiver device that is coupled to the processor by the short range wireless data communication circuit.

14. A method for performing an operation on a handheld device comprising a processor, a memory coupled to the processor, and a wireless network transceiver coupled to the processor, comprising:

selecting a frequency band on an FM receiver;

receiving Radio Data System (RDS) data via the FM receiver;

recognizing a particular information contained within an RDS data packet;

performing an operation on an application residing on the handheld device of the handheld device based upon information contained within the RDS data packet containing the recognized particular information; and generating navigation information based on the information contained within the RDS data packet containing the recognized particular information and a position and a direction of travel of the handheld device calculated based on signals received via the GPS receiver.

15. The method of claim 14, further comprising storing at least a portion of the RDS data packet in the memory.

16. The method of claim 15, wherein performing an operation comprises notifying an active application that at least a portion of the RDS data packet is stored in memory.

17. The method of claim 14, wherein performing an operation comprises activating a dormant application.

18. The method of claim 14, wherein performing an operation comprises generating an image presented on a display.

19. The method of claim 14, further wherein performing an operation comprises:

activating an application that recalls data stored in the memory; and generating an image presented on the display.

20. The method of claim 14, wherein performing an operation comprises initiating a wireless data call via the wireless network transceiver.

21. The method of claim 14, wherein performing an operation comprises initiating a wireless telephone call via the wireless network transceiver.

22. The method of claim 14, wherein performing an operation comprises:

transmitting, via the wireless network transceiver, a wireless query to a media server including at least a portion of the information contained within the RDS data; and receiving data from the media server in response to the query.

23. The method of claim 14, wherein performing an operation comprises:

transmitting, via the wireless network transceiver, a wireless query to a media server including at least a portion of the information contained within the RDS data;

receiving data from the media server in response to the query; and generating an image presented on a display based upon the received data.

24. The method of claim 14, further comprising monitoring all receivable FM radio broadcasts for RDS data.

25. The method of claim 14, wherein receiving RDS data via an FM receiver comprises receiving RDS data from an FM receiver circuit positioned within a separate FM receiver device via a wired data communication circuit.

26. The method of claim 14, wherein receiving RDS data via an FM receiver comprises receiving RDS data from an FM receiver circuit positioned within a separate FM receiver via a short range wireless data communication circuit.

27. A handheld device comprising a processor, a memory coupled to the processor, and a wireless network transceiver coupled to the processor, comprising:

means for selecting a frequency band on an FM receiver;

means for receiving Radio Data System (RDS) data via the FM receiver;

means for recognizing particular information recognizing a particular information contained within an RDS data packet;

means for performing an operation on an application residing on the handheld device based upon information contained within the RDS data packet containing the recognized particular information; and means for generating navigation information based on the information contained within the RDS data packet containing the recognized particular information and a position and a direction of travel of the handheld device calculated based on signals received via the GPS receiver.

28. The handheld device of claim 27, further comprising means for storing at least a portion of the RDS data packet in the memory.

29. The handheld device of claim 27, wherein the means for performing an operation comprises means for activating a dormant application.

30. The handheld device of claim 28, wherein the means for performing an operation comprises means for notifying an active application that at least a portion of the RDS data packet is stored in memory.

31. The handheld device of claim 27, wherein the means for performing an operation comprises means for generating an image presented on a display.

32. The handheld device of claim 27, further wherein the means for performing an operation comprises:

means for activating an application that recalls data stored in the memory; and means for generating an image presented on a display.

33. The handheld device of claim 27, wherein the means for performing an operation comprises means for initiating a wireless data call via the wireless network transceiver.

34. The handheld device of claim 27, wherein the means for performing an operation comprises means for initiating a wireless telephone call via the wireless network transceiver.

35. The handheld device of claim 27, wherein the means for performing an operation comprises:

means for transmitting a wireless query to a media server including at least a portion of the information contained within the RDS data via the wireless network transceiver; and means for receiving data from the media server in response to the query.

36. The handheld device of claim 27, wherein the means for performing an operation comprises:

means for transmitting a wireless query to a media server including at least a portion of the information contained within the RDS data via the wireless network transceiver;

means for receiving data from the media server in response to the query; and means for generating an image presented on a display based upon the received data.

37. The handheld device of claim 27, further comprising means for monitoring all receivable FM radio broadcasts for RDS data.

38. The handheld device of claim 27, wherein the means for receiving RDS data via an FM receiver comprises an FM receiver circuit positioned within a separate FM receiver device and a short range wired data communication circuit.

39. The handheld device of claim 27, wherein the means for receiving RDS data via an FM receiver comprises an FM receiver circuit positioned within a separate FM receiver and a short range wireless data communication circuit.

40. The handheld device of claim 27, wherein the means for performing an operation comprises means tuning the FM receiver to a particular FM radio station and recording at least a portion of a broadcast.

41. A non-transitory processor readable storage medium having stored thereon processor-executable software instructions configured to cause a processor of a handheld device to execute steps comprising:

selecting a frequency band on an FM receiver;

receiving Radio Data System (RDS) data via the FM receiver;

recognizing a particular information contained within an RDS data packet;

performing an operation on an application residing on the handheld device based upon information contained within the RDS data packet containing the recognized particular information; and generating navigation information based on the information contained within the RDS data packet containing the recognized particular information and a position and a direction of travel of the handheld device calculated based on signals received via the GPS receiver.

42. The non-transitory processor readable storage medium of claim 41, wherein the stored software instructions are configured to cause the processor to execute further steps comprising:

storing at least a portion of the RDS data packet in the memory.

43. The non-transitory processor readable storage medium of claim 41, wherein the stored software instructions are configured to cause the processor to execute further steps such that performing an operation comprises activating a dormant application.

44. The non-transitory processor readable storage medium of claim 41, wherein the stored software instructions are configured to cause the processor to execute further steps such that performing an operation comprises notifying an active application that at least a portion of the RDS data packet is stored in memory.

45. The non-transitory processor readable storage medium of claim 41, wherein the stored software instructions are configured to cause the processor to execute further steps such that performing an operation comprises generating an image presented on a display.

46. The non-transitory processor readable storage medium of claim 41, wherein the stored software instructions are configured to cause the processor to execute further steps such that performing an operation comprises:

activating an application that recalls data stored in the memory; and generating an image presented on a display.

47. The non-transitory processor readable storage medium of claim 41, wherein the stored software instructions are configured to cause the processor to execute further steps such that performing an operation comprises initiating a wireless data call via the wireless network transceiver.

48. The non-transitory processor readable storage medium of claim 41, wherein the stored software instructions are configured to cause the processor to execute further steps such that performing an operation comprises initiating a wireless telephone call via the wireless network transceiver.

49. The non-transitory processor readable storage medium of claim 41, wherein the stored software instructions are configured to cause the processor to execute further steps such that performing an operation comprises:

transmitting a wireless query to a media server including at least a portion of the information contained within the RDS data via the wireless network transceiver; and receiving data from the media server in response to the query.

50. The non-transitory processor readable storage medium of claim 41, wherein the stored software instructions are configured to cause the processor to execute further steps such that performing an operation comprises:

transmitting a wireless query to a media server including at least a portion of the information contained within the RDS data via the wireless network transceiver;

receiving data from the media server in response to the query; and generating an image presented on a display based upon the received data.

51. The non-transitory processor readable storage medium of claim 41, wherein the stored software instructions are configured to cause the processor to execute further steps comprising:

monitoring all receivable FM radio broadcasts for RDS data.

52. The non-transitory processor readable storage medium of claim 41, wherein the stored software instructions are configured to cause the processor to execute further steps comprising:

receiving RDS data from an FM receiver circuit positioned within a separate FM receiver device via a wired data communication circuit.

53. The non-transitory processor readable storage medium of claim 41, wherein the stored software instructions are configured to cause the processor to execute further steps comprising:

receiving RDS data from an FM receiver circuit positioned within a separate FM receiver via a short range wireless data communication circuit.

54. The non-transitory processor readable storage medium of claim 41, wherein the stored software instructions are configured to cause the processor to execute further steps such that performing an operation comprises tuning the FM receiver to a particular FM radio station and recording at least a portion of a broadcast.

* * * * *